(12) United States Patent
Bertram et al.

(10) Patent No.: US 9,639,401 B1
(45) Date of Patent: May 2, 2017

(54) MULTICORE ADAPTIVE SCHEDULER

(71) Applicant: Rockwell Collins, Inc., Cedar Rapids, IA (US)

(72) Inventors: Joshua R. Bertram, Cedar Rapids, IA (US); Branden H. Sletteland, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 104 days.

(21) Appl. No.: 14/273,130

(22) Filed: May 8, 2014

(51) Int. Cl.
*G06F 9/46* (2006.01)
*G06F 9/50* (2006.01)

(52) U.S. Cl.
CPC .................... *G06F 9/5038* (2013.01)

(58) Field of Classification Search
None
See application file for complete search history.

(56) References Cited

U.S. PATENT DOCUMENTS

| | | | | |
|---|---|---|---|---|
| 2002/0120661 A1* | 8/2002 | Binns | ................... | G06F 9/4887 718/102 |
| 2005/0028160 A1* | 2/2005 | Cofer | ................... | G06F 9/4881 718/100 |
| 2006/0107264 A1* | 5/2006 | Schmidt | ................ | G06F 9/4887 718/100 |
| 2013/0138271 A1* | 5/2013 | Danielsson | ........... | H04L 67/322 701/3 |
| 2013/0166271 A1* | 6/2013 | Danielsson | ......... | G06F 11/3664 703/22 |
| 2014/0281088 A1* | 9/2014 | VanderLeest | ........... | G06F 13/26 710/264 |
| 2014/0351819 A1* | 11/2014 | Shah | ..................... | G06F 9/4887 718/103 |
| 2015/0135183 A1* | 5/2015 | Kipp | ........................ | G06F 9/46 718/103 |

* cited by examiner

*Primary Examiner* — Diem Cao
(74) *Attorney, Agent, or Firm* — Angel N. Gerdzhikov; Donna P. Suchy; Daniel M. Barbieri

(57) ABSTRACT

A multicore adaptive scheduler of tasks in an ARINC 653-compliant avionics system allocates flight critical tasks execution time equivalent to their worst case execution time and allocates quality-driven tasks minimum execution time equivalent to their minimum completion time. The scheduler may also offset the start time of a task or define an upper bound for completion time of a quality-driven task. The scheduler generates and executes partition schedules of tasks, reallocating execution time unused by completed tasks and reallocating execution time from interrupt handlers to tasks preempted by interrupts. The scheduler may also analyze the viability of a generated schedule. The scheduler uses rate limiting and flow control techniques to ensure a predictable amount of execution time to be reallocated for interrupt handling.

20 Claims, 22 Drawing Sheets

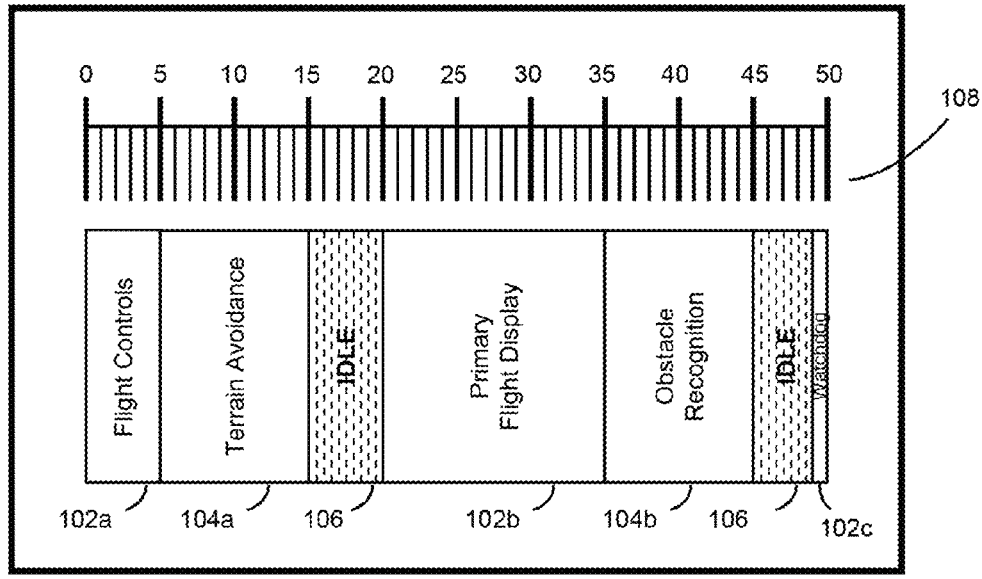

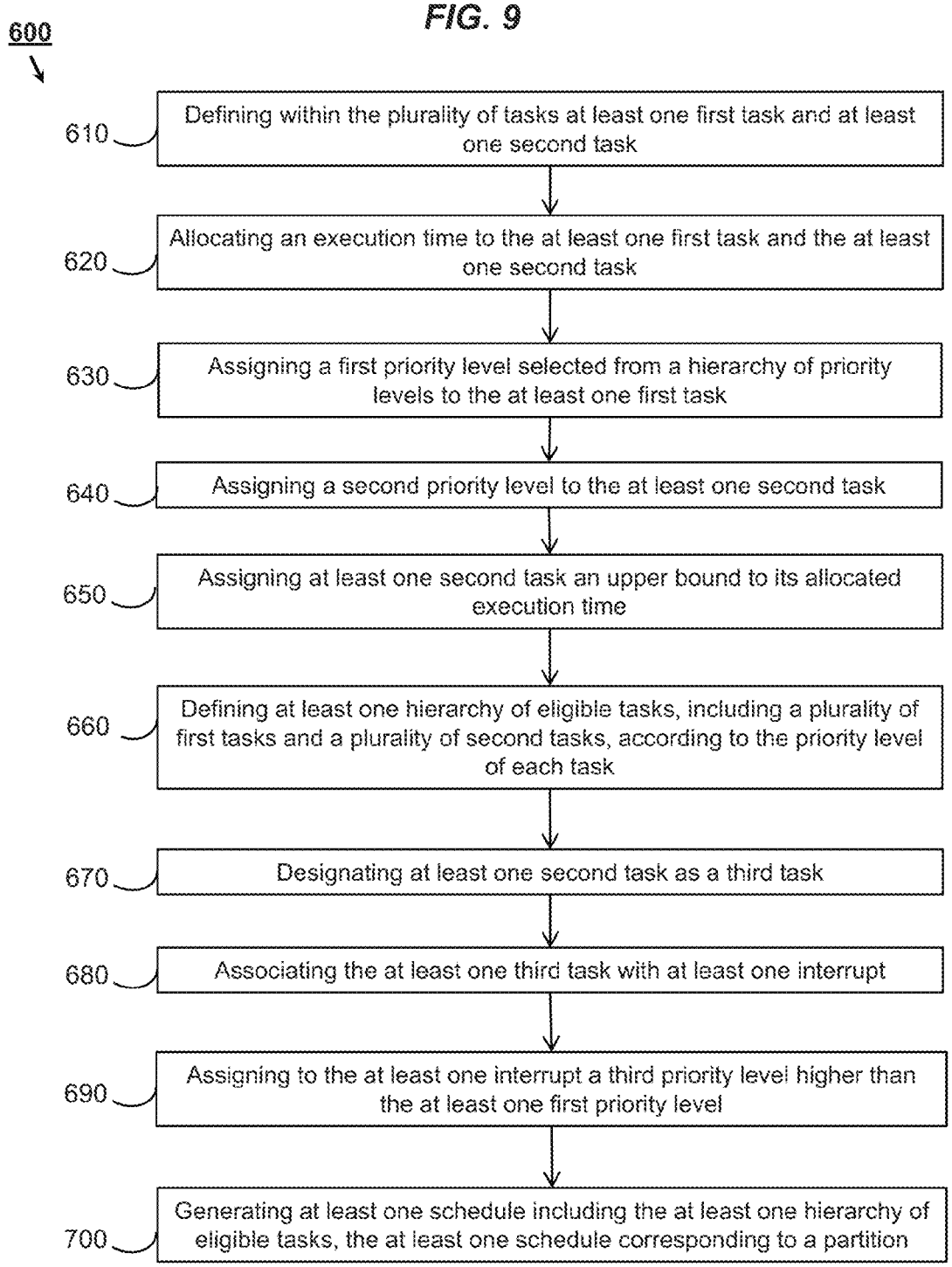

MULTICORE ADAPTIVE SCHEDULER

TECHNICAL FIELD

The following disclosure relates generally to avionics systems and particularly to scheduling and handling multiple tasks in an avionics system.

BACKGROUND

When running multiple applications in real time on avionics hardware in a partitioned environment (e.g., ARINC 653), each application is said to be partitioned by time, by space, and by resource. Time partitioning refers to the deterministic execution of an application. Given a particular set of inputs, the application will always produce the same set of outputs (ex.—results). Another interpretation of time partitioning is that at any time the state of the system processor, and the precise instruction executing at any given moment in time, can be known and predicted. Therefore in such an environment the Worst Case Execution Time (WCET) of any deterministic task can be accurately measured.

However, as processor technology has evolved to incorporate superscalar architectures, branch prediction, caching and other features, instruction timing has become impossible to perform with any certainty. Contemporary avionics interpretations of determinism refer to "bounded determinism", which emphasizes establishing an upper bound on non-deterministic effects inherent in today's modern processors. These non-deterministic effects typically have one of three causes: asynchronous events, unbounded inputs, or contention for resources. Asynchronous events (e.g., interrupts or system messages), may be mitigated by avoiding or disabling interrupts, or through intermediate buffering via I/O or network offload processor. Unbounded inputs (e.g., a "storm" of interrupts or flood of Ethernet packets) may be mitigated by leaky buckets or other flow control mechanisms. Contention for resources (e.g., sharing of cache, RAM, busses) may be mitigated by limiting its impact (e.g., cache way locking) or by accounting for contention in WCET analysis.

The upper bound of an application then informs the scheduling of deadlines and the WCET analysis of the application. In order to improve determinism in an avionics environment, tradeoffs are generally made. For example, polling-based I/O may be used to minimize or eliminate sources of interrupts in an avionics system, sacrificing a portion of the CPU to achieve bounded determinism.

In an ARINC 653 environment, for example, scheduling of tasks (ex.—threads, processes, applications) is done via a cyclic fixed-time scheduler which provides each partition with a fixed amount of time per a predetermined schedule. To ensure the viability of a schedule, scheduling analysis may be performed (e.g., via Rate Monotonic Analysis or other equivalent scheduling algorithms). Scheduling fixed time partitions (ex.—time slices) is generally viewed as an acceptable sacrifice for avionics applications, which can be inherently cyclic in nature as they respond with fixed frequency to changes in airspeed, altitude, and the environment. The workload is discrete and deterministic (a known set of inputs and a well-defined sense of schedule) and thus somewhat predictable. ARINC 653 works in this context because it guarantees a fixed amount of processing to solve a fixed problem.

In both commercial and avionics applications, there is an increased need for soft real-time applications (e.g., video processing, map generation, terrain and obstacle recognition) that require a minimum level of processing but may yield an increased quality result given additional processing beyond the minimum level. For example, an obstacle avoidance process may detect the presence of an obstacle and roughly estimate its bounds or dimensions for display. With increased processing, however, it may be possible to characterize the obstacle as a wire, a tower, or a building, or to refine its bounds and produce a higher quality result for the pilot to interpret.

Because of the increased need for such soft real-time applications, scheduling priorities have shifted from requiring a fixed amount of scheduling to mobilizing all available scheduling not used by critical tasks and processes. At the same time, however, tasks must be managed so they do not consume an unbounded amount of processor time or resources and erode the foundation of ARINC 653 partitioning. It may therefore be desirable to guarantee a fixed amount of processing to some tasks while marshalling unused processing for soft real-time tasks, all while preserving time, space and resource partitioning.

SUMMARY

In embodiments, a multicore adaptive partition scheduler according to the present invention may define avionics tasks (ex.—threads, processes) to be executed as flight-critical tasks (FCT) and quality-driven tasks (QDT). In embodiments, a partition scheduler according to the present invention may allocate to each flight-critical task CPU time equivalent to its worst case execution time (WCET). In embodiments, each flight-critical task may indicate to the scheduler when it has completed, or be preempted if it has not completed when its allocated WCET expires. In embodiments, a partition scheduler according to the present invention may allocate to each quality-driven task CPU time equivalent to its minimum necessary completion time. In embodiments, the scheduler may assign each flight-critical task and each quality-driven task a priority level (e.g., an integer value from 1 to 10). In embodiments, the scheduler may assign to a flight-critical task or a quality-driven task an eligibility offset representing a known, deterministic start time relative to the start of the major frame (ex.—time partition). In embodiments, the scheduler may assign to some quality-driven tasks an upper bound on CPU time to be consumed. In embodiments, the scheduler may generate partition schedules comprising a hierarchy of eligible tasks, i.e., flight-critical tasks with no eligibility offset and quality-driven tasks with no eligibility offset, and a hierarchy of offset tasks.

In embodiments, the scheduler may execute a generated partition schedule by designating the eligible task with the highest priority level as the current task and then executing the current task. In embodiments, when the hierarchy of eligible tasks includes a task of higher priority than the current task, the scheduler may designate the current task as a preempted task and designate the higher priority task as the current task (in other words, setting the presently running task aside in favor of the higher priority task), and then execute the current task. In embodiments, when an offset time is reached, the scheduler may designate the current task as a preempted task, designate the task associated with the particular offset time as the current task, and execute the current task. In embodiments, when the current task returns a result (ex.—completes, returns a useful result), the scheduler may reallocate any remaining execution time allocated to the current task to at least one eligible task of lower priority level than the current task and then disable the current task. In embodiments, when the current task reaches either its allocated execution time or its upper bound, and the current task has no execution time reallocated to it, the scheduler may then disable the current task. In embodiments, when the current task is disabled and a preempted task has not yet returned a result (ex.—has not completed) and the preempted task has allocated or reallocated execution time remaining, the scheduler may then designate the preempted task as the current task and execute the current task. In embodiments, when the end of a major frame is reached, the scheduler may then disable any remaining eligible tasks. In embodiments, a partition scheduler according to the present invention may extend schedule generation and execution to multiple processors or cores.

In embodiments, a partition scheduler according to the present invention may designate at least one quality-driven task as an interrupt handler and associate the interrupt handler with one or more interrupts. In embodiments, the execution time allocated to the interrupt handler may be equivalent to its minimum necessary completion time. In embodiments, the scheduler may then assign to each associated interrupt a priority level higher than that of any flight-critical task. In embodiments, the scheduler may then add the interrupt handler to the hierarchy of eligible tasks based on its priority level. In embodiments, the partition scheduler may, when the currently executing task is preempted by an interrupt of higher priority level and the interrupt is associated with an eligible task, execute the interrupt. In embodiments, the scheduler may then reallocate an amount of execution time (equivalent to the execution time necessary to execute the interrupt) from the interrupt handler associated with the interrupt to the current task. In embodiments, the scheduler may then resume execution of the current task. In embodiments, when an interrupt handler exhausts its allocated execution time and has no reallocated execution time, the scheduler may then disable the interrupt handler and disable any associated interrupt.

In embodiments, the partition scheduler may start a timer to run for a predetermined interval and increment a counter when the current task is preempted by an interrupt. In embodiments, if the counter reaches a predetermined threshold (ex.—bucket depth) the scheduler may then disable the preempting interrupt and resume executing the current task. In embodiments, when the timer reaches the end of its predetermined interval the scheduler may then reset both the timer and the counter to zero. In other embodiments, if the timer reaches its predetermined interval and the counter has not yet reached its threshold, the scheduler may instead increase the counter threshold by the difference between the counter and the counter threshold before resetting the timer and the counter to zero. In other embodiments, when the currently executing task is preempted by one or more interrupts, the scheduler may increment a counter and, while the counter is under a predetermined threshold, execute each interrupt and start for each interrupt executed a timer set to run for a predetermined interval. In embodiments, as each interrupt timer runs out (ex.—reaches its interval), the scheduler may then decrement the counter to reflect the associated interrupt leaving the sliding window.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The advantages of the invention may be better understood by those skilled in the art by reference to the accompanying figures in which:

FIG. 1 is a block diagram of a prior art partition schedule;

FIG. 2 is a table illustrating a classification of avionics tasks;

FIGS. 9-23 are process flow diagrams illustrating a method according to embodiments of the present invention.

DETAILED DESCRIPTION

Figure 3:
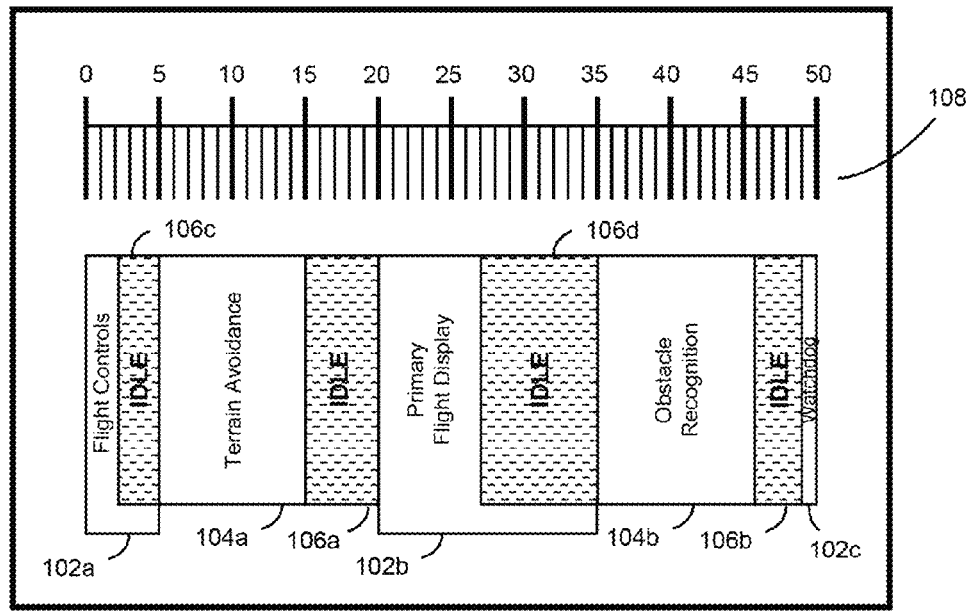
FIG. 3 is a block diagram of a prior art manually adjusted partition schedule.

Features of the present invention in its various embodiments are exemplified by the following descriptions with reference to the accompanying drawings, which describe the present invention with further detail. These drawings depict only selected embodiments of the present invention, and should not be considered to limit its scope in any way.

FIG. 1 illustrates a partition schedule 100 incorporating prior art ARINC 653 principles and scheduling algorithms. For a given partition, ARINC 653 scheduling is designed both to provide a guaranteed minimum of CPU (ex.—processor) time to each task (ex.—process, thread) and to enforce an upper bound of CPU time for each task. A guaranteed minimum ensures that each task is allowed to execute. An upper bound ensures that each task will not consume more CPU than it is allocated.

In embodiments, a partition scheduler according to the present invention may define tasks to be executed as flight-critical tasks (FCT) and quality-driven tasks (QDT). In embodiments, a partition scheduler according to the present invention may allocate to each flight-critical task CPU time equivalent to its worst case execution time (WCET). Flight-critical tasks are hard real-time tasks that, when a deadline is missed, lead to system failure. Flight-critical tasks may have a deterministic workload to be performed based on a set of inputs. Therefore, it may be possible to calculate the worst case execution time (WCET) of a flight-critical task. In embodiments, each flight-critical task may indicate to the scheduler when it has completed or be preempted if it has not completed when its allocated WCET expires. Therefore the scheduler may prevent flight-critical tasks from exceeding their upper bounds, and may additionally perform a fault recovery action. In embodiments, a partition scheduler according to the present invention may allocate to each quality-driven task CPU time equivalent to its minimum necessary completion time (e.g., the minimum processing time to reach a useful result). Unlike flight-critical tasks, quality-driven tasks may have a nondeterministic workload based in part on varied or asynchronous inputs. Due to these asynchronous inputs, or due to a desire to maximize the quality of the result where possible, quality-driven tasks may not have an easily identifiable WCET.

In embodiments, the scheduler may assign each flight-critical task and each quality-driven task a priority level. For example, referring to FIG. 2, assuming a major frame 108 of 50 ms, flight controls process 102a, primary flight display 102b, and watchdog process 102c may be classified as flight-critical tasks. Flight controls process 102a processes flight status inputs while adjusting flaps and ailerons to maintain a flight path. If flight controls process 102a does not execute normally, the result may be catastrophic failure. In embodiments, flight controls process 102a may therefore be assigned a very high priority level. Primary flight display process 102b renders a display for the pilot; here the result of failure may also be catastrophic, but less so than failure of the aircraft configuration (e.g., as determined by flight controls process 102a). Therefore, in embodiments, primary flight display process 102b, while also a flight-critical task, may also be assigned a high priority level (but a lower priority than flight controls process 102a).

In embodiments, the scheduler may assign to a flight-critical task or a quality-driven task an eligibility offset representing a known, deterministic start time relative to the start of major frame 108. For example, watchdog timer 102c may be assigned the highest priority of any eligible task, as the task must execute once during every 50 ms major frame 108. However, it may not be necessary for this to happen at any particular time during the major frame 108. Therefore the scheduler may assign watchdog timer 102c an eligibility offset of 49 ms, as the timer requires only 1 ms WCET. In embodiments, when the 49 ms offset point is reached, the scheduler may add watchdog timer 102c to the hierarchy of eligible tasks; as the highest priority task it may then take precedence over any other task and execute precisely at 49 ms. Similarly, primary flight display 102b running in major frame 108 may be assigned a very high priority and an eligibility offset of 20 ms that allows other tasks of lower priority to take precedence. When 20 ms has elapsed and the offset point of primary flight display 102b is reached, primary flight display 102b may become an eligible task and execute immediately if there is no eligible task with a higher priority level.

In embodiments, the scheduler may assign to some quality-driven tasks an upper bound on CPU time to be consumed. Quality-driven tasks are similar to hard real-time tasks in that they require a minimum level of processing to produce a minimum quality result. Quality-driven tasks are similar to soft real-time tasks, however, in that additional processing dedicated to the quality-driven task may potentially improve the quality of the result. Additionally, quality-driven tasks may include a mechanism for determining a point at which the quality of the result has reached a maximum level or an acceptable tolerance level. Further processing beyond this level may not provide sufficient refinement of the result to be of any value. For example, referring back to FIG. 1, in embodiments terrain avoidance process 104a and obstacle recognition process 104b may be classified as quality-driven tasks. Terrain avoidance process 104a may identify and categorize terrain based on radar returns and a terrain database. Terrain avoidance process 104a may require 10 ms to render a meaningful result, but this result may improve in quality with up to 15 ms of operation. Obstacle recognition process 104b may identify objects returned from point cloud LIDAR data, determine the bounds of obstacles, and attempt to classify the obstacles based on a variety of factors (e.g., shape). Obstacle recognition process 104b may require 10 ms for basic operation, but the quality of the result returned may also improve with additional CPU time.

In embodiments, the scheduler may generate partition schedules comprising a hierarchy of eligible tasks, i.e., flight-critical tasks and quality-driven tasks. In some embodiments, partition schedules may comprise a hierarchy of eligible tasks with no eligibility offset, plus a hierarchy of offset tasks. Referring to FIG. 2, flight controls process 102a, terrain avoidance process 104a, and obstacle recognition process 104b may be immediately eligible tasks arranged in order of their assigned priority level. Watchdog timer 102c and primary flight display process 102b may be offset tasks arranged according to their assigned priority level. In some embodiments, a generated schedule may be analyzed for viability using traditional Rate Monotonic Analysis (RMA), Earliest Deadline First (EDF) scheduling algorithms, or any equivalent form of schedule analysis.

In embodiments, the scheduler may execute a generated partition schedule by designating the eligible task with the highest priority level as the current task and then executing the current task. For example, referring back to FIG. 1, at the starting point of major frame 108 the eligible tasks may include flight controls process 102b, followed by terrain avoidance process 104a and obstacle recognition process 104b. In embodiments, these processes may execute in descending order of priority. In embodiments, primary flight display process 102b and watchdog timer 102c may be added to the hierarchy at their respective offset points (i.e., 20 ms and 49 ms) and execute promptly if there is no eligible task of higher priority remaining.

In embodiments, when the hierarchy of eligible tasks includes a task of higher priority than the current task, the scheduler may designate the current task as a preempted task and designate the higher priority task as the current task (in other words, setting the presently running task aside in favor of the higher priority task), and then execute the current task. In embodiments, when an offset time is reached, the scheduler may designate the current task as a preempted task, designate the task associated with the particular offset time as the current task, and execute the current task. For example, at the 20 ms mark of major frame 108, primary flight display process 102b may reach its assigned offset point and be entered into the hierarchy of eligible tasks, which at that point includes only terrain avoidance process 104a and obstacle recognition process 104b (watchdog timer 102c is offset and flight controls process 102a has already executed this major frame 108). As primary flight display process 102b is the highest priority eligible task, it may execute promptly at 20 ms. In embodiments, if another eligible task of lower priority level is running at an offset time, the scheduler may preempt the lower priority task in favor of executing the higher priority offset task.

In embodiments, when the current task returns a result (ex.—completes, returns a useful result), the scheduler may reallocate any remaining execution time allocated to the current task to at least one eligible task of lower priority level than the current task and disable the current task. In embodiments, when the current task reaches either its allocated execution time or its upper bound (if the current task has been allocated an upper bound), and the current task has no execution time reallocated to it, the scheduler may then disable the current task. In embodiments, disabling an eligible task may include removing the disabled task from the hierarchy of eligible tasks. In embodiments, when the current task is disabled and a previously preempted task has not yet returned a result (ex.—has not completed) and the preempted task has allocated or reallocated execution time remaining, the scheduler may then designate the previously preempted task as the current task and execute the current task.

FIG. 3 illustrates a prior art generated schedule 150 executing in major frame 108. Note from FIG. 1 that prior art schedulers may leave portions of idle time 106 throughout major frame 108, when no task is currently executing and the CPU goes unused. Additionally, in embodiments some tasks may complete (ex.—return a result) before their allotted WCET is exhausted. For example, flight controls process 102a may complete after 2 ms of its allocated 5 ms minimum (ex.—WCET) and primary flight display 102b may complete after 7 ms of its allocated 15 ms minimum. Therefore, in addition to idle portions 106a, 106b (left idle by prior art scheduling), additional idle portions 106c, 106d may result: of the 50 ms major frame 108, the CPU may be utilized for only 31 ms, or less than two-thirds of its available time.

Figure 4:
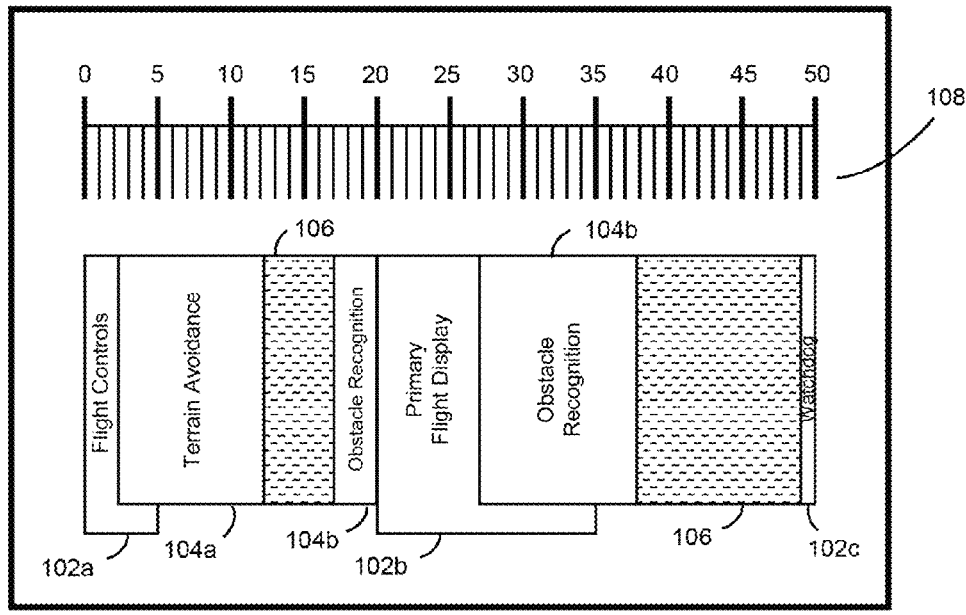
FIG. 4 is a block diagram of a partition schedule according to embodiments of the present invention.

FIG. 4 illustrates an executing schedule 200 generated and dynamically adjusted by a scheduler of an embodiment of the present invention so that available CPU time allocated to higher priority tasks can be consumed while lower priority tasks are allowed to execute. In embodiments, when flight controls process 102a completes after 2 ms, it may yield the balance of its time (3 ms) to terrain avoidance process 104a, the eligible task of next highest priority, which may then execute early at 2 ms and reach its minimum allocated execution time (10 ms) at 12 ms. At 12 ms, there being no eligible task of higher priority, terrain avoidance process 104a may continue to execute until reaching its upper bound (15 ms) at 17 ms. At 17 ms, as primary flight display process 102b is offset to 20 ms, the only other eligible task at that point is obstacle recognition process 104b, which may then execute at 17 ms only to be preempted at 20 ms by primary flight display 102b, which has a higher priority and therefore becomes the current task. Primary flight display process 102b may then execute at 20 ms and complete early at 27 ms, at which point preempted obstacle recognition process 104b may again become the current task and may execute until reaching its 10 ms minimum at 34 ms. In embodiments, the scheduler may configure flight-critical tasks to execute at deterministic start times and consume as much CPU time as they need, while allowing quality-driven tasks to maximize the quality of their results by using available CPU time. In embodiments, when the end of major frame 108 is reached (50 ms), the scheduler may then disable any remaining eligible tasks, including current tasks and preempted tasks.

Asynchronous or unbounded interrupts, especially those related to I/O (e.g., interrupts associated with Ethernet controllers), can make it difficult if not impossible to accurately predict the amount of CPU time necessary to handle an unknown number of interrupts, complicating the generation of a deterministic partition schedule. This is especially true in a modern multicore environment, where interrupts may serve as "doorbells" between one core and another, and where I/O may be offloaded to special IP blocks within a system-on-a-chip device, which is often interrupt-driven to support high-throughput applications (e.g., telecom networking).

Figure 5:
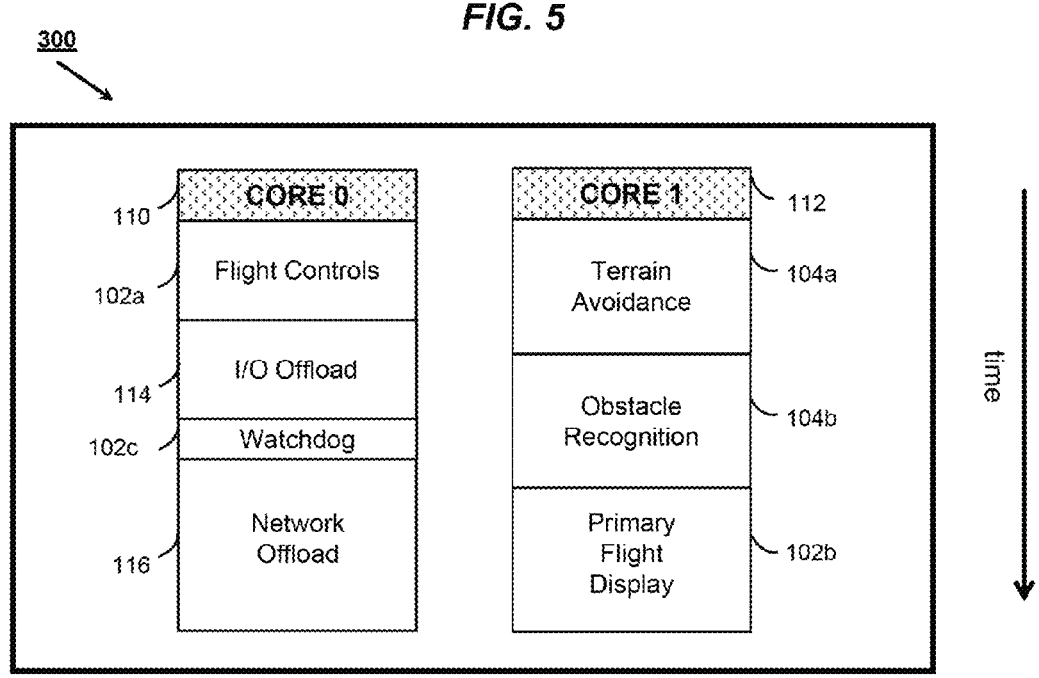
FIG. 5 is a block diagram of partition scheduling across multiple processor cores.

FIG. 5 illustrates a multicore environment 300 including processor cores 110 and 112. In embodiments, a partition scheduler according to the present invention may extend schedule generation and execution to multiple processors or cores. For example, flight controls process 102a, I/O offload 114, watchdog timer 102c, and network offload 116 may be assigned to core no for scheduling and execution while core 112 handles terrain avoidance process 104a, obstacle recognition process 104b, and primary flight display process 102b simultaneously within the same major frame. In embodiments, each core may run its own operating system and offload any shared devices or resources to an I/O offload process 114 or a network offload process 116, with which any task may communicate through a low-overhead high-throughput communications channel.

Figure 6:
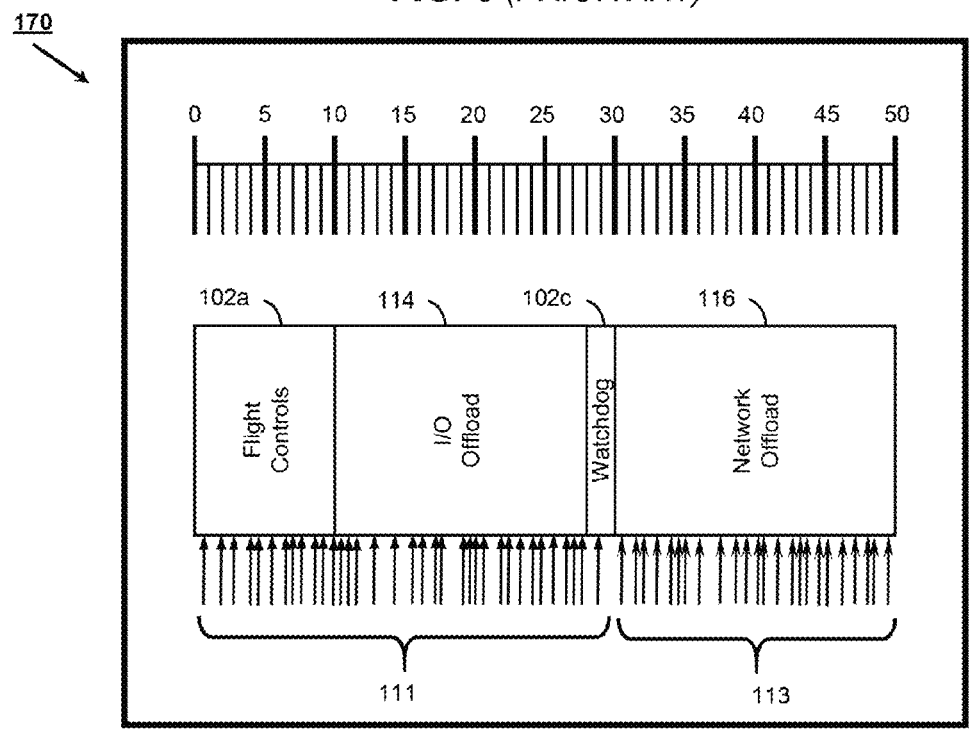
FIG. 6 is a block diagram of interrupt handling in a partition schedule.

FIG. 6 illustrates a prior art schedule 170 executing in major frame 108. Interrupts 111 and 113 are associated with network offload process 116, but only interrupts 113 fire while the network offload process 116 is scheduled. While network offload process 116 may be assigned to a particular core and scheduled via time slicing, the problem may persist of how to handle interrupts 111, 113 associated with network offload process 116. In embodiments, while major frame 108 executes, interrupts 113 may fire while network offload process 116 is scheduled (and thus do not contribute to the problem), but interrupts 111 may fire while other processes are scheduled. Disabling the interrupts 111 (ex.—preventing interrupts 111 from firing) while network offload process 116 is not scheduled may significantly degrade the responsiveness and increase the latency of the software. However, allowing every interrupt 111 to fire at will may steal processing time from other vital tasks (e.g., flight controls process 102a, I/O offload process 114, and watchdog timer 102c). While each interrupt 111 may require only a small timeslice to execute (e.g., a few microseconds) and thus have a negligible individual impact on system performance, the aggregate effect of a large number of interrupts 111 may significantly affect the WCET of the task they preempt (1,000 interrupts 111 at 3 µs each=3 ms). As a result, a frequently preempted flight-critical task may not complete within its allotted WCET.

Embodiments of a partition scheduler according to the present invention may address the problem of interrupt handling through a variety of rate limiting techniques. For most tasks scheduled within a major frame, it may be more important for the task to complete within the major frame than for the task to complete within its exact allocated WCET with respect to wall clock time. Most flight-critical tasks generally perform a known function on a cyclic basis and do not depend on nanosecond- or microsecond-level accuracy to return a useful result. For such tasks, rate limiting is an attractive solution to the problem of interrupt handling. By implementing rate limiting techniques, embodiments of the partition scheduler may (1) guarantee each flight-critical task an amount of CPU time equivalent to its WCET, (2) guarantee each interrupt-based task its allocated CPU time, although the allocated CPU time may be distributed throughout the major frame, and (3) guarantee that all tasks receive their originally allocated CPU time, although the precise start and end times of a task may vary "jitter" from its original schedule.

Figure 7:
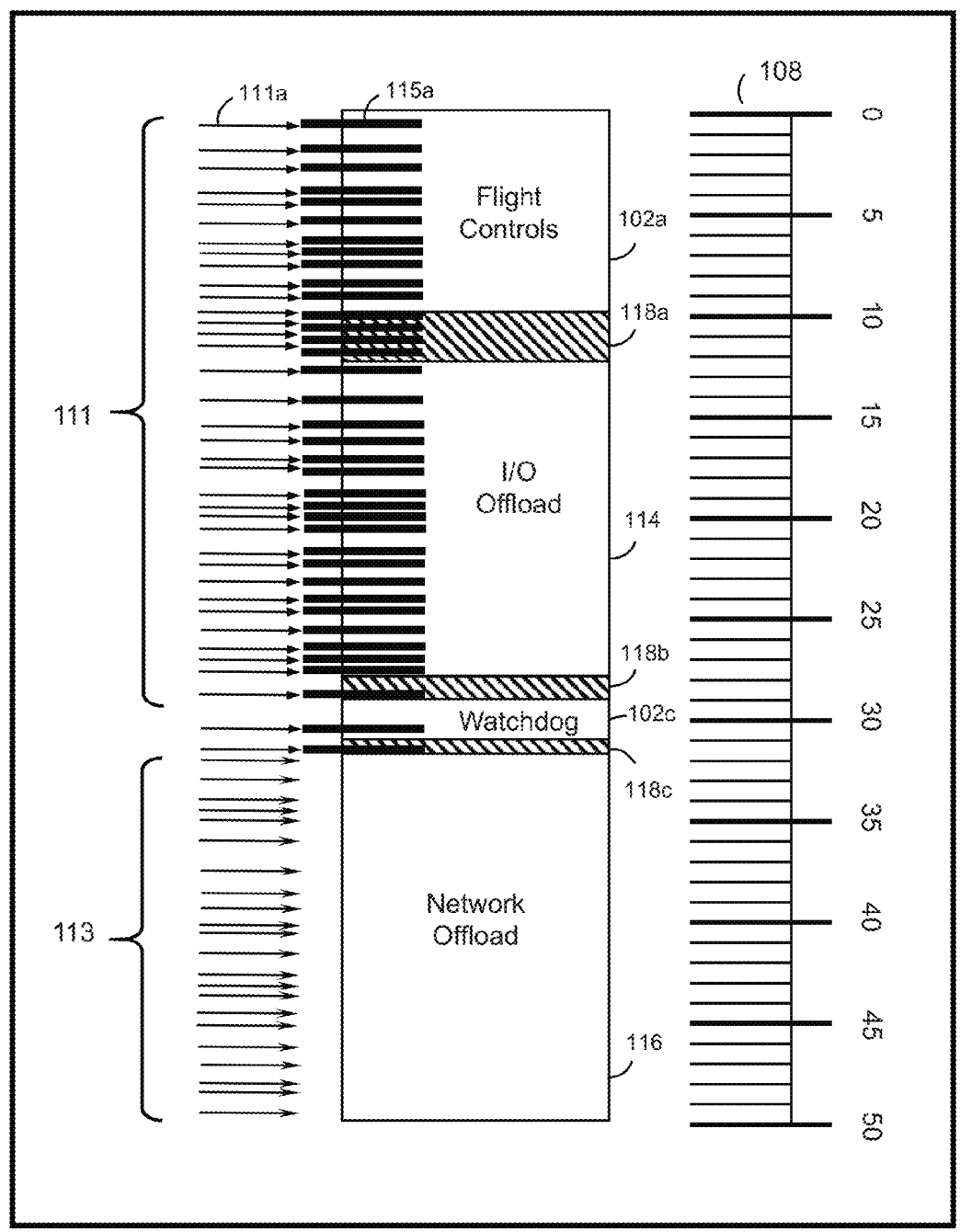
FIG. 7 is a block diagram of interrupt handling in a partition schedule according to embodiments of the present invention.

FIG. 7 illustrates a partition schedule 400 implemented by a scheduler of the present invention. In embodiments, time slices may be allocated across major frame 108 as in FIG. 6. Interrupts 113 may be handled by network offload process 116 without incident. Interrupts 111, also associated with network offload process 116, are allowed to preempt flight controls process 102a, I/O offload process 114, and watchdog timer 102c due to the high priority level of interrupts 111. Each time an interrupt 111a fires, it may create a time window 115a representing the CPU time the interrupt "steals" from the task it preempts. In embodiments, the scheduler may charge these time windows 115 to the associated interrupt handler (network offload process 116) and allocate additional slices of time 118 to each preempted task. In this way each task may be guaranteed its allocated amount of time in which to complete, although each task may not start or complete at its originally scheduled time. For example, time slice 118a extends flight controls process 102a, time slice 118b extends I/O offload process 114, and time slice 118c extends watchdog timer 102c.

Figure 8A:
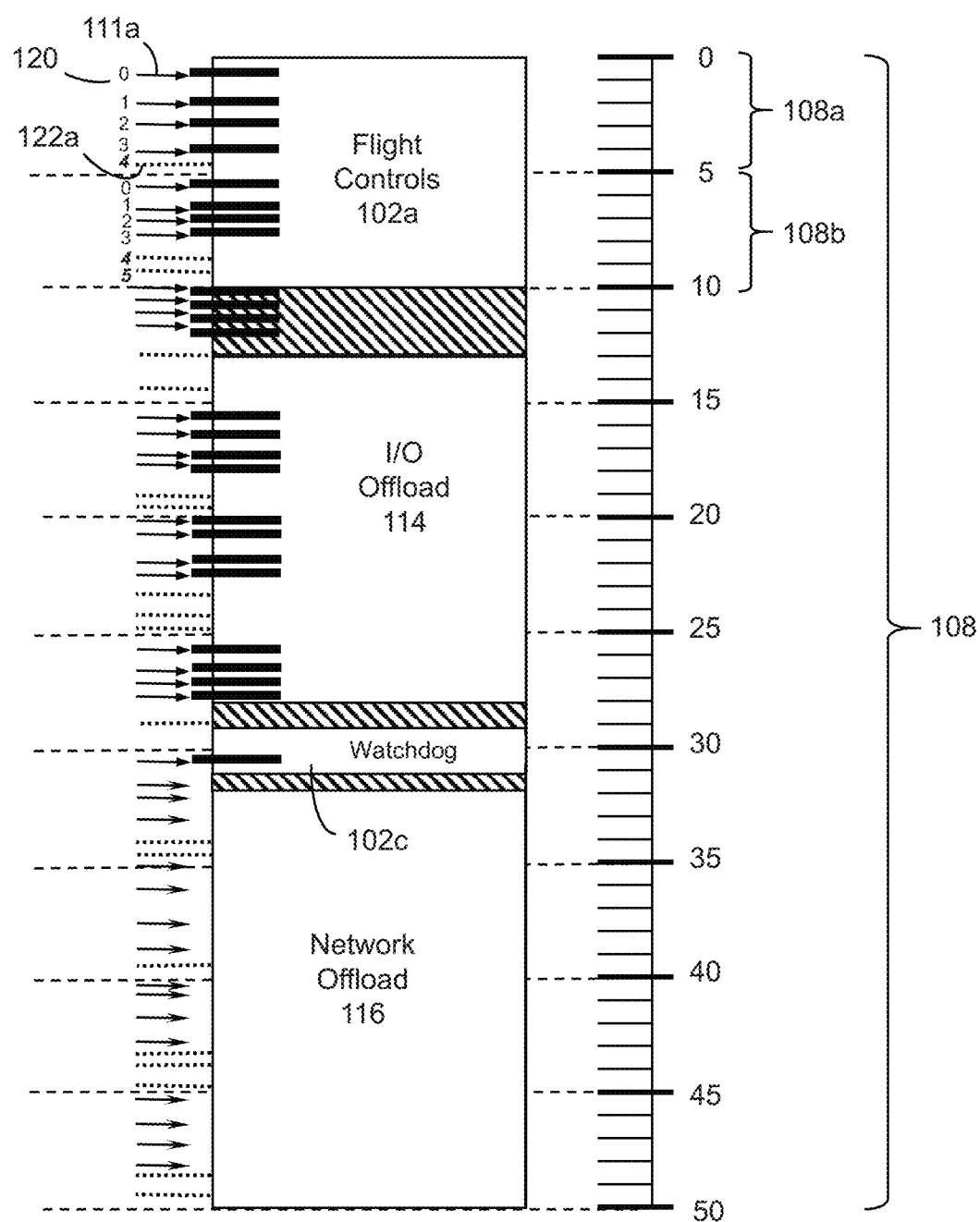
FIG. 8A is a block diagram of interrupt handling via rate limiting according to embodiments of the present invention.
Figure 8B:
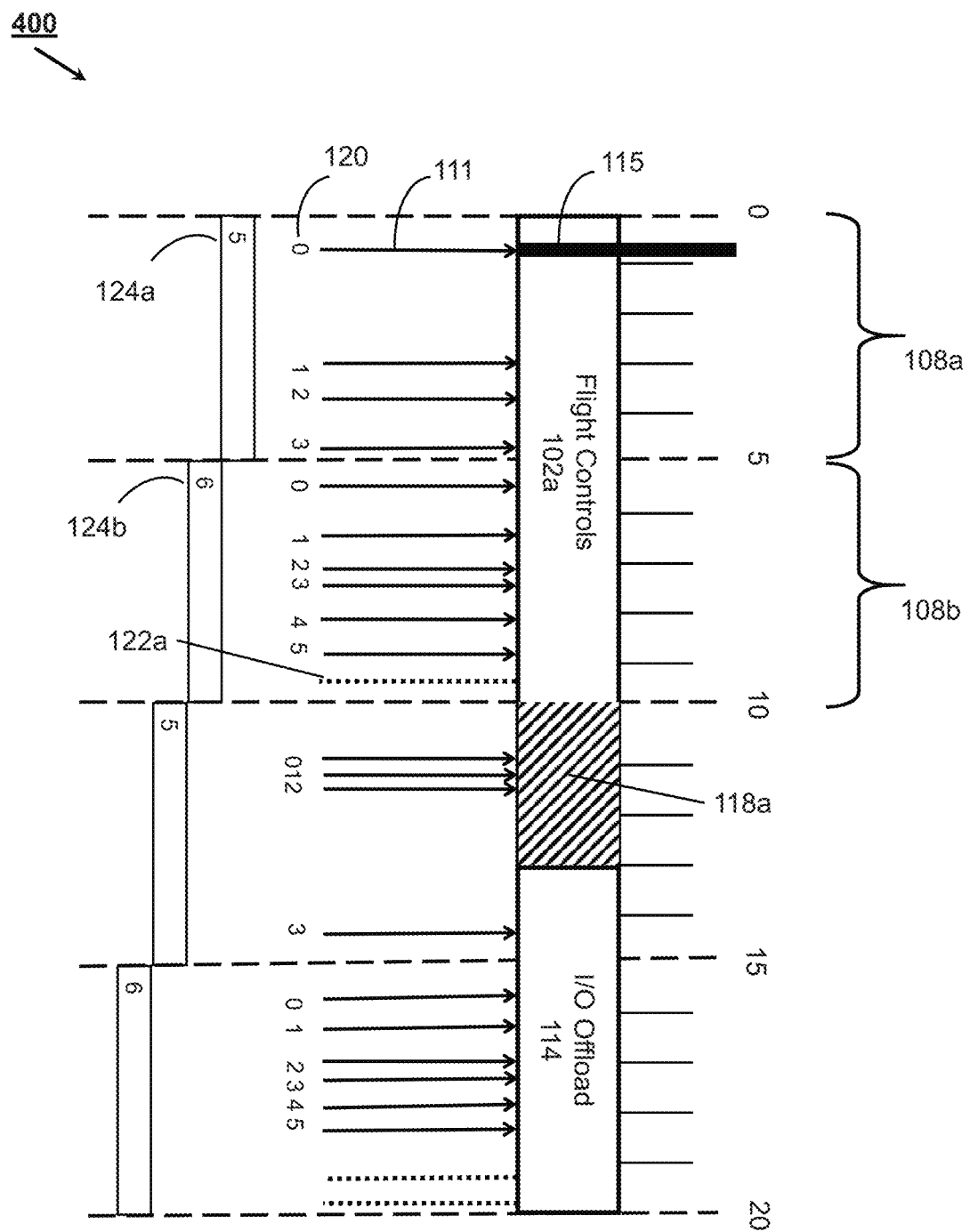
FIG. 8B is a block diagram of interrupt handling via rate limiting according to embodiments of the present invention.
Figure 8C:
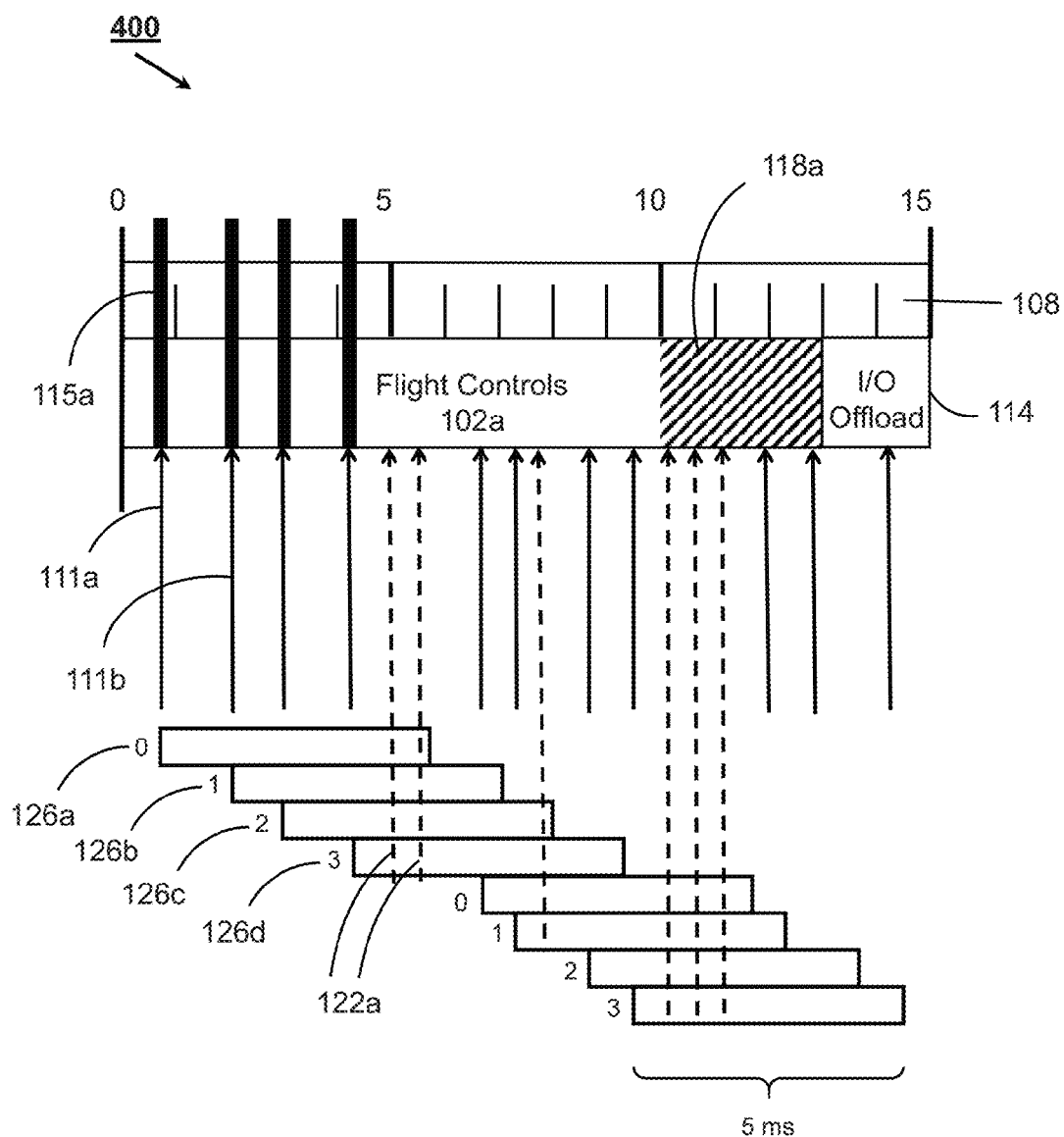
FIG. 8C is a block diagram of interrupt handling via rate limiting according to embodiments of the present invention.

FIGS. 8A through 8C illustrate embodiments of methods for bounding interrupt-induced jitter in a partition schedule 400, including leaky-bucket, cumulative-window, and sliding window bounding techniques. While rate limiting techniques provide a means of accounting for CPU time "stolen" from tasks by firing interrupts through the reallocation of CPU time, unbounded or asynchronous interrupts may still complicate the prediction of just how much the WCET of a given flight-critical task may expand due to firing interrupts. In embodiments, the partition scheduler may solve this problem by imposing through rate limiting mechanisms an upper bound on the amount of CPU time dedicated to interrupt handling. FIG. 8A illustrates an embodiment of an executing schedule 400 incorporating rate limiting based on leaky-bucket algorithms. In embodiments, the upper bound of allowable interrupts 111 may be set at 4 interrupts 111 per 5 ms. Therefore, major frame 108 may be divided into ten equivalent (e.g., 5 ms each for a 50 ms major frame) frame windows (ex.—segments, subdivisions) 108a, 108b . . . 108j; when a new frame window begins, the "bucket" empties. In some embodiments, segment end points within a partition may be determined by a timer. Throughout frame window 108a, for example, flight controls process 102a may be preempted by four interrupts 111. In embodiments, counter 120 may increment when each interrupt 111 fires; when the counter 120 reaches the predetermined limit of four interrupts 111, no further interrupts 111 may be allowed for the duration of that frame window 108a. Each successive interrupt 122a may be disabled until the next frame window 108b starts, at which point the counter may reset to zero and interrupts 111 are once again allowed to fire until the limit is reached. This way a predictable amount of time may be set aside for interrupt handling at a slight performance cost.

In other embodiments, referring to FIG. 8B, if the scheduler handles less than the maximum number of interrupts 111 per frame window 108a, the counter threshold 124 for the following frame window 108b may be incremented to allow for these "extra" interrupts. For example, assuming a threshold of five interrupts per 5-ms frame window, the scheduler may only handle four interrupts 111 throughout frame window 108a. Therefore counter threshold 124b (for frame window 108b) may be set to six interrupts 111, or five plus the extra interrupt not handled in frame window 108a. In embodiments, if the scheduler then processes six interrupts 111 during frame window 108b (disabling a seventh interrupt 122a after the counter threshold 124b is reached), the counter threshold 124c for frame window 108c may be set at five, as no cumulative interrupts were passed along from the previous frame window 108b.

In other embodiments, referring to FIG. 8C, the scheduler may uncouple the leaky-bucket algorithm from the major frame 108 and implement a "sliding window" strategy designed to prevent more than a set number of interrupts from firing during any time window of desired size in the major frame 108. For example, if the rate limit is set to four interrupts 111 over any 5 ms interval, the scheduler may incorporate a set of four timers 126, each set for a 5 ms interval. In embodiments, when major frame 108 starts to execute and the first interrupt 111a fires, preempting flight controls process 102a, timer 126a may start to count down from 5 ms. When the second interrupt 111b fires, timer 126b may also count down from 5 ms. If two more interrupts fire, timers 126c and 126d respectively may be triggered. If all four timers 126 are triggered before timer 126a has reached the end of its 5-ms interval, the scheduler may then disable subsequent interrupts 122a until timer 126a expires. When this happens, timer 126a may be re-triggered by the next allowed interrupt 111. When all four timers 126 are in operation, the scheduler may then disable all interrupts until a timer expires, thus ensuring no more than four interrupts 111 fire during any 5 ms interval.

FIG. 9 illustrates a process flow diagram of a method 600 for scheduling a plurality of tasks to be performed by at least one processor core according to an embodiment of the present invention. In one embodiment, the partition is an ARINC 653 partition. It is noted herein that the method 600 may be carried out utilizing any of the embodiments described previously. It is further noted, however, that method 600 is not limited to the components or configurations described previously as multiple components and/or configurations may be suitable for executing method 600.

At step 610, the method 600 defines within the plurality of tasks at least one first task and at least one second task. In one embodiment, the at least one first task may be a flight-critical task and the at least one second task may be a quality-driven task. In one embodiment, the at least one first task may be configured to return a result at completion. In one embodiment the at least one second task may be configured to determine a quality of a result and to return a result when the quality level of the result reaches a threshold. At step 620, the method 600 allocates an execution time to the at least one first task and the at least one second task. In one embodiment, the allocated execution time may be equivalent to the worst case execution time (WCET) of a flight-critical task. In one embodiment, the allocated execution time may be equivalent to the minimum necessary completion time of a quality-driven task. At step 630, the method 600 assigns a first priority level selected from a hierarchy of priority levels to the at least one first task. At step 640, the method 600 assigns a second priority level to the at least one second task. At step 650, the method 600 assigns at least one second task an upper bound to its allocated execution time. At step 660, the method boo defines at least one hierarchy of eligible tasks, including a plurality of first tasks and a plurality of second tasks, according to the priority level of each task.

At step 670, the method 600 designates at least one second task as a third task. In one embodiment, the at least one third task may be an interrupt handler. At step 680, the method 600 associates the at least one third task with at least one interrupt. At step 690, the method 600 assigns to the at least one interrupt a third priority level higher than the at least one first priority level. At step 700, the method 600 generates at least one schedule including the at least one hierarchy of eligible tasks, the at least one schedule corresponding to a partition.

Figure 10:
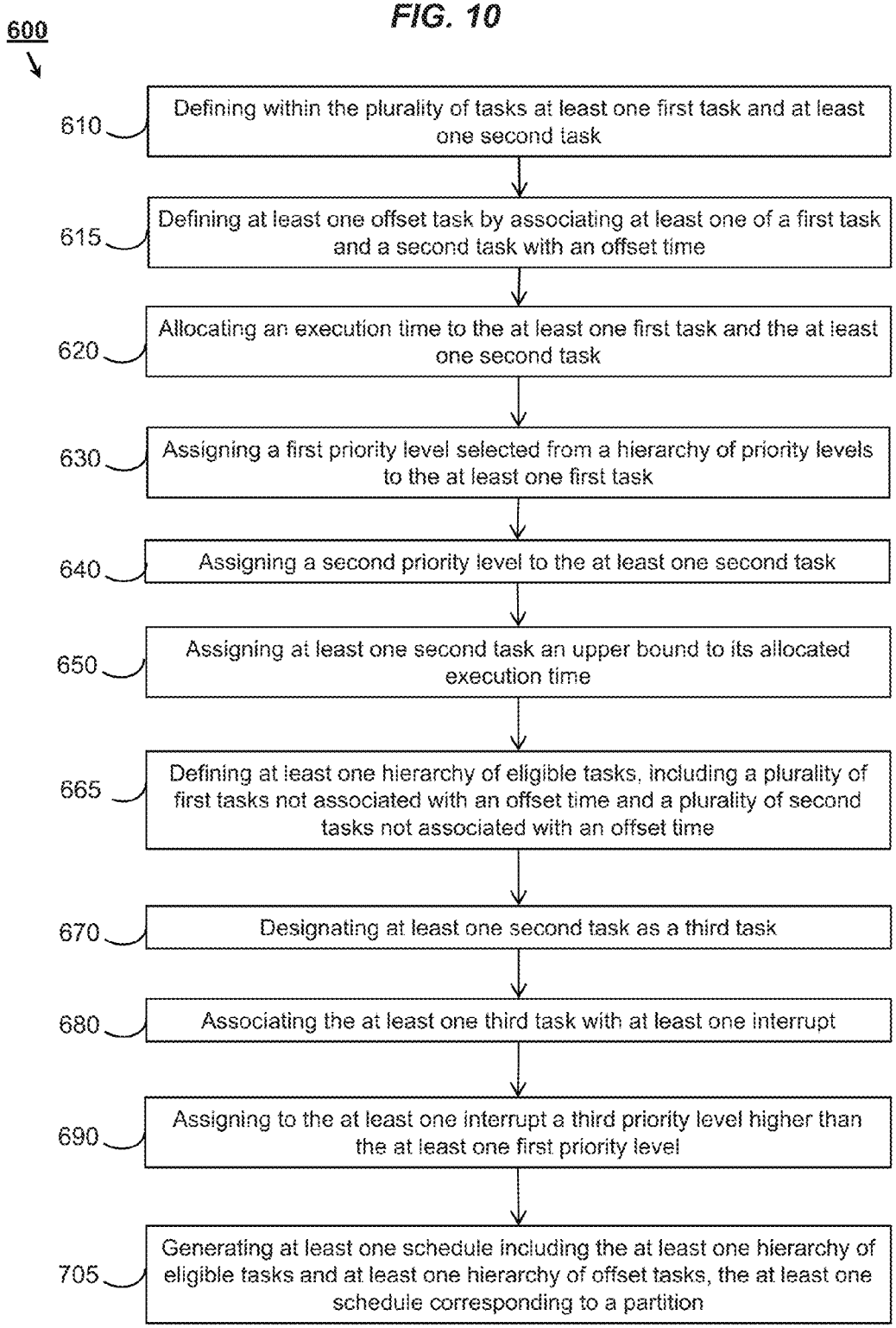

Referring to FIG. 10, the method 600 as illustrated by FIG. 9 may include additional steps 615, 665, and 705. At step 615, the method 600 defines at least one offset task by associating at least one of a first task and a second task with an offset time. At step 665, the method 600 defines at least one hierarchy of eligible tasks, including a plurality of first tasks not associated with an offset time and a plurality of second tasks not associated with an offset time, according to the priority level of each task. At step 705, the method 600 generates at least one schedule including the at least one hierarchy of eligible tasks and at least one hierarchy of offset tasks, the at least one schedule corresponding to a partition.

Figure 11:
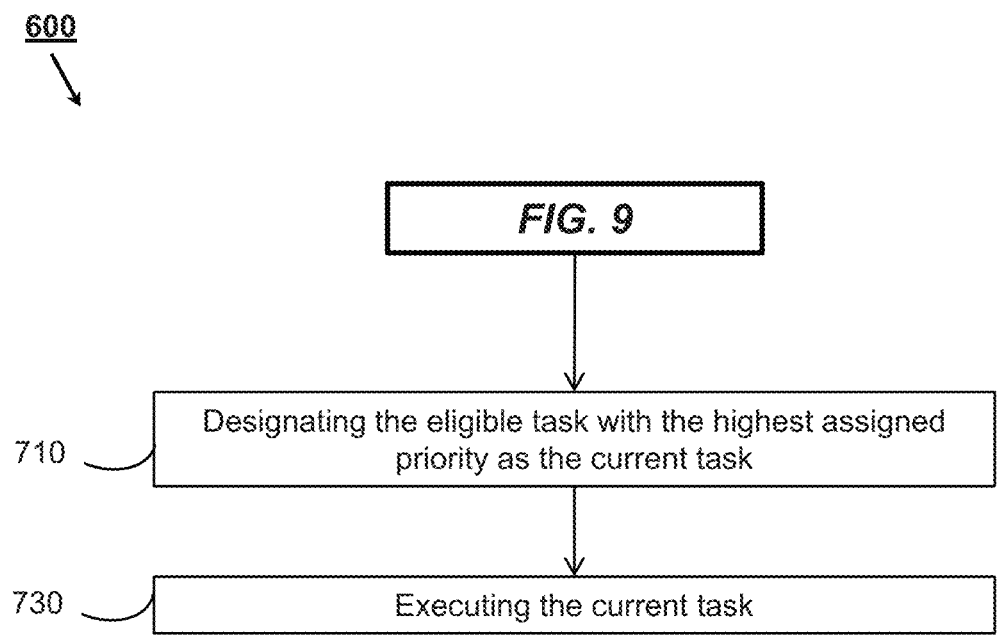

Referring to FIG. 11, the method 600 as illustrated by FIG. 9 may include additional steps 710 and 730. At step 710, the method 600 designates the eligible task with the highest priority level as the current task. At step 730, the method 600 executes the current task.

Figure 12:
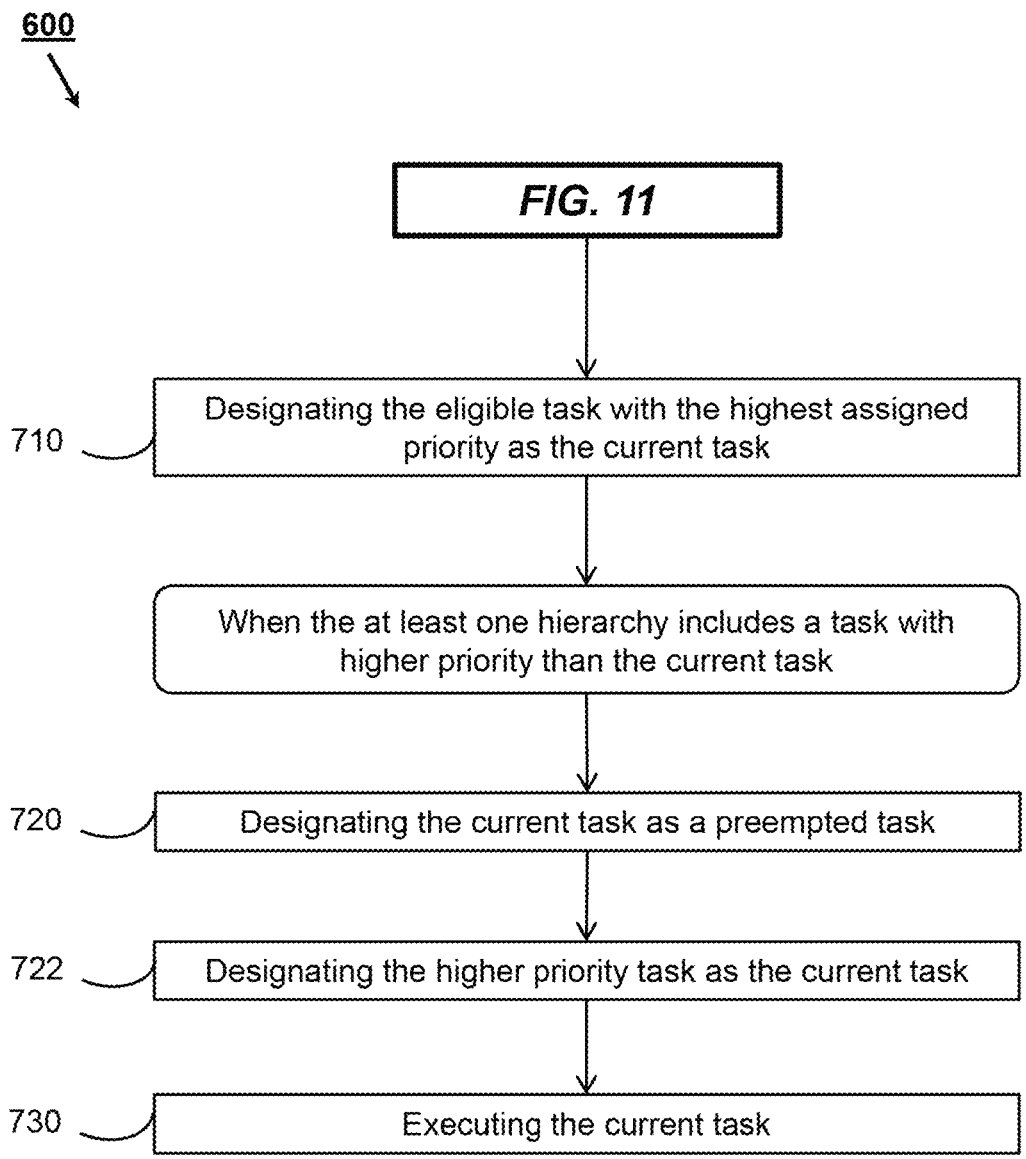

Referring to FIG. 12, the method 600 as illustrated by FIG. 11 may include additional steps 720 and 722. At step 720, when the at least one hierarchy includes a task with higher priority than the current task, the method 600 designates the current task as a preempted task. At step 722, the method 600 designates the higher priority task as the current task.

Figure 13:
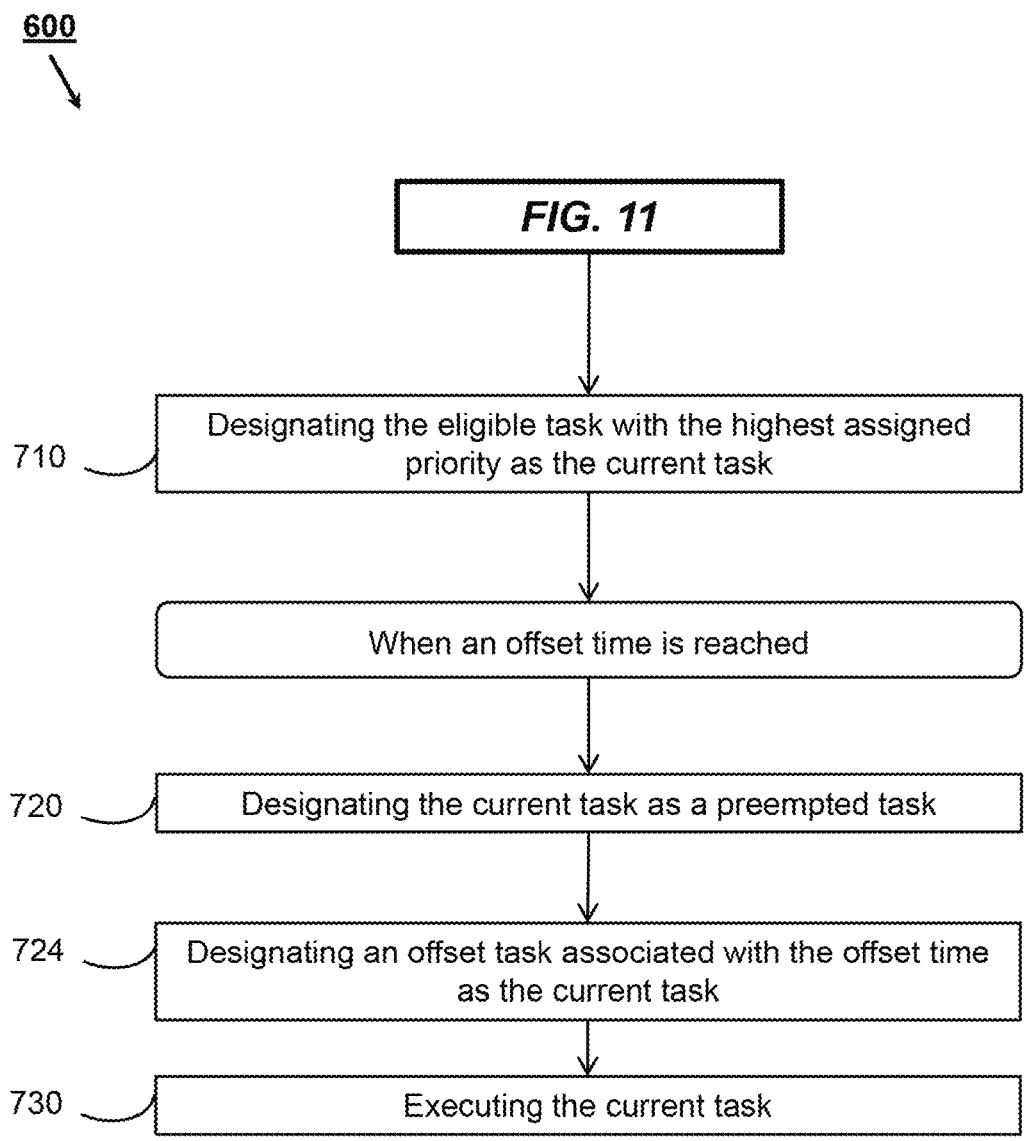

Referring to FIG. 13, the method 600 as illustrated by FIG. 11 may include additional steps 720 and 724. At step 720, when an offset time is reached, the method 600 designates the current task as a preempted task. At step 724, the method 600 designates an offset task associated with the offset time as the current task.

Figure 14:
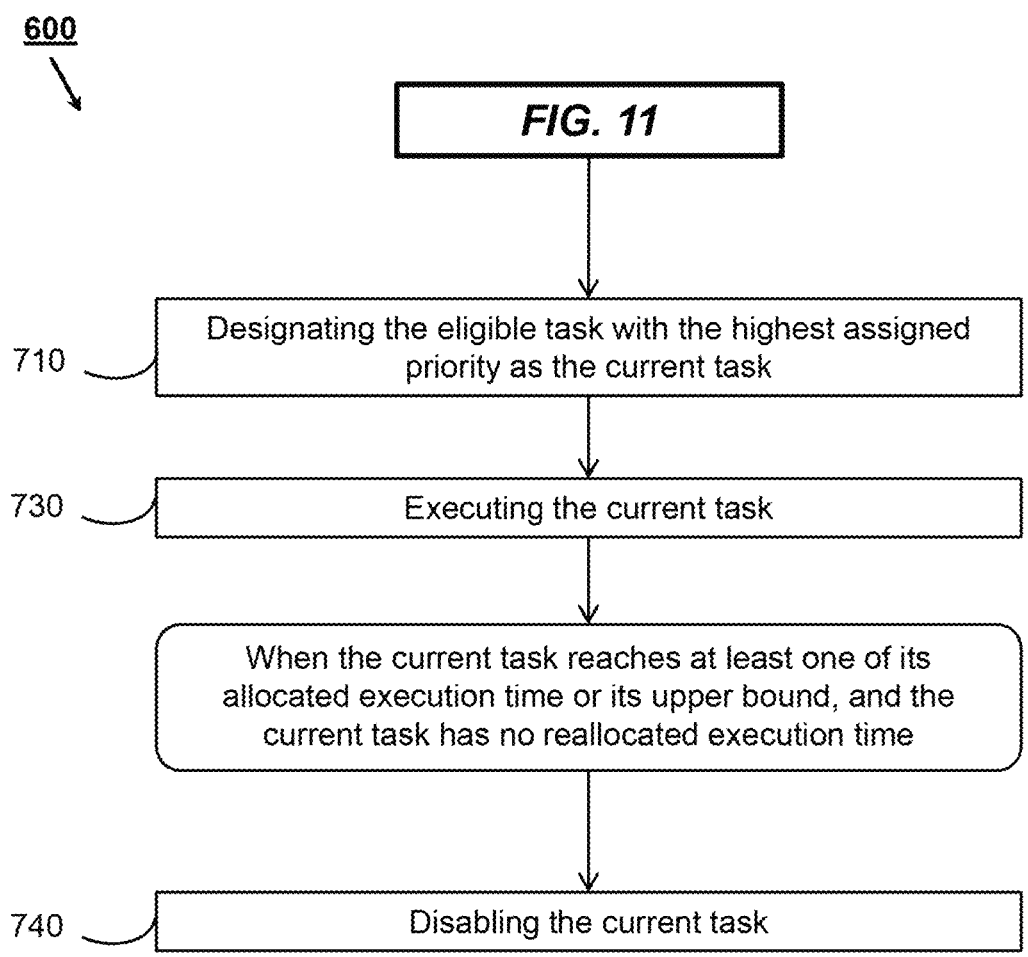

Referring to FIG. 14, the method 600 as illustrated by FIG. 11 may include additional step 740. At step 740, when the current task reaches at least one of its allocated execution time or its upper bound, and the current task has no reallocated execution time, the method 600 disables the current task.

Figure 15:
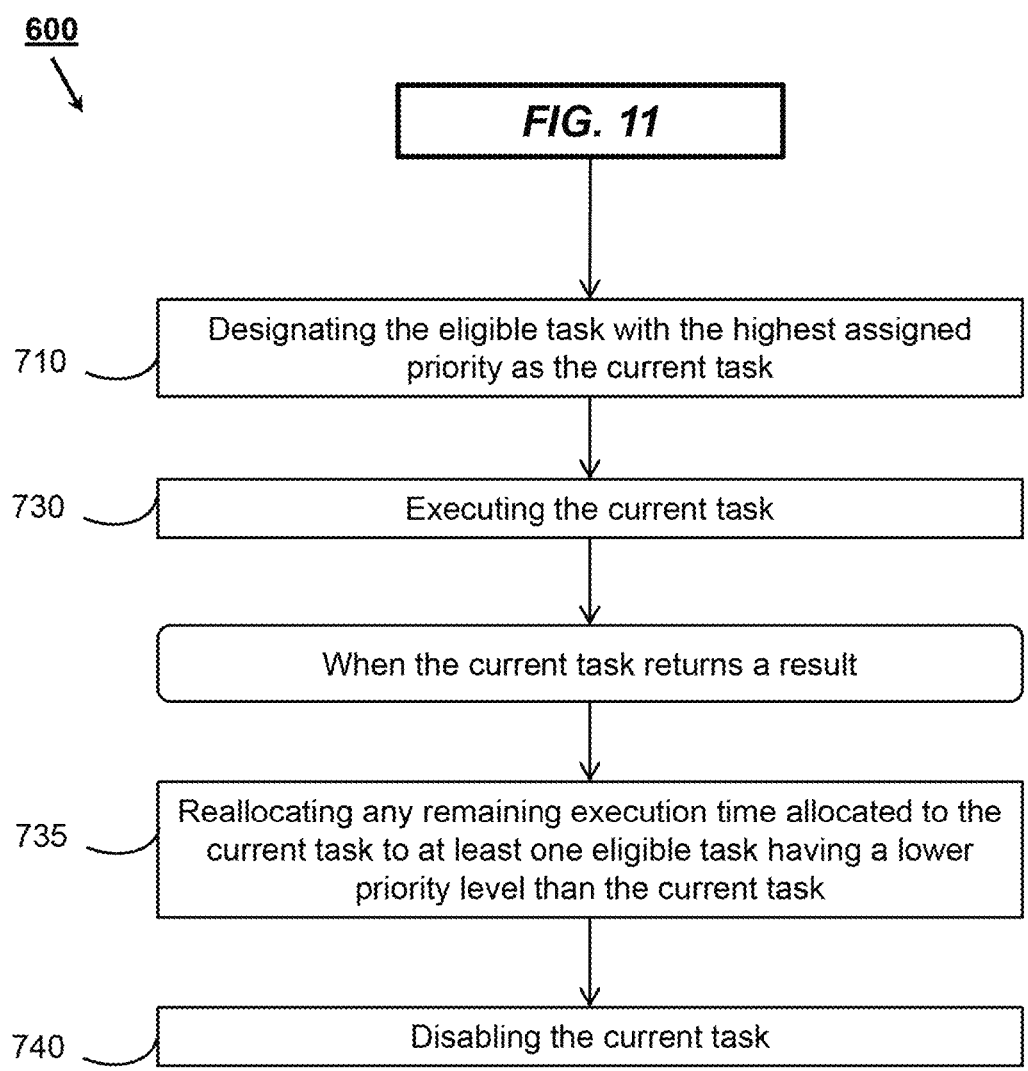

Referring to FIG. 15, the method 600 as illustrated by FIG. 11 may include additional step 735. At step 735, when the current task returns a result, the method 600 reallocates any remaining execution time allocated to the current task to at least one eligible task having a lower priority level than the current task.

Figure 16:
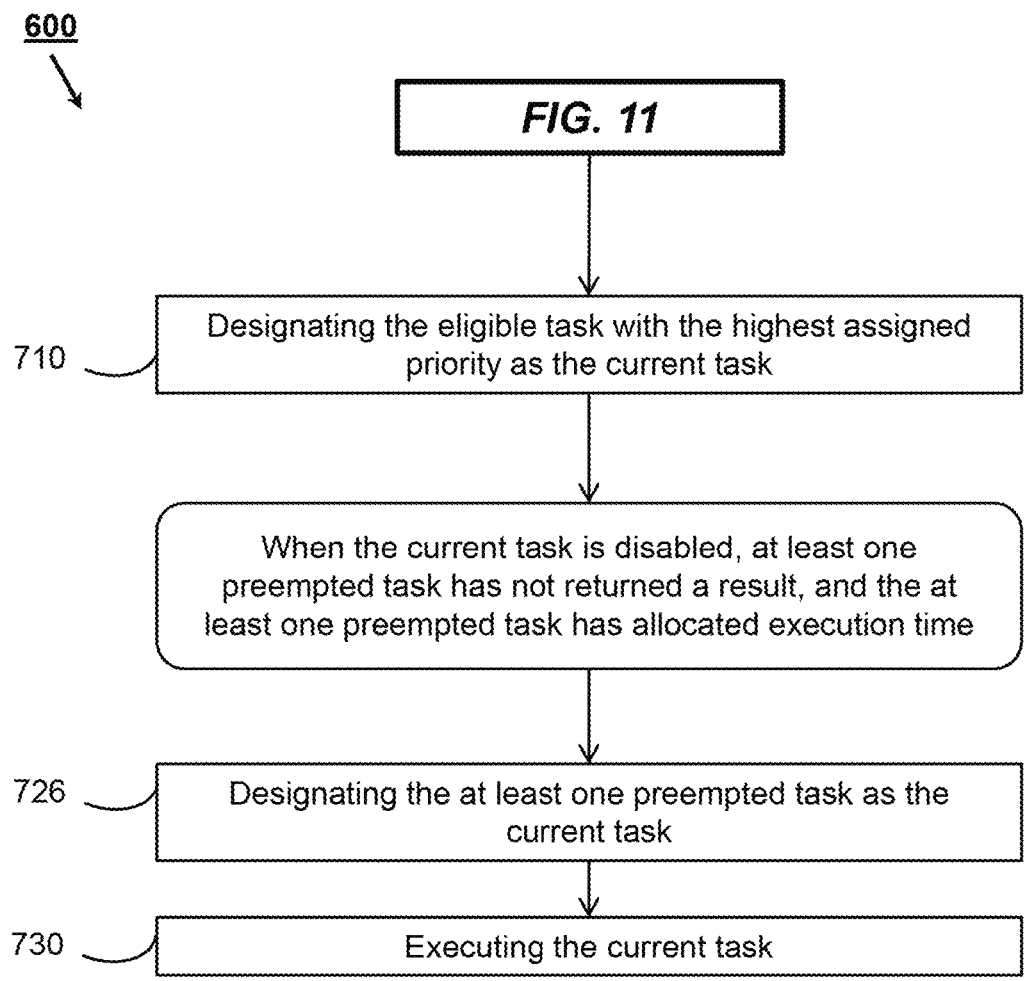

Referring to FIG. 16, the method 600 as illustrated by FIG. 11 may include additional step 724. At step 724, when the current task is disabled, at least one preempted task has not returned a result, and the at least one preempted task has allocated execution time, the method 600 designates the at least one preempted task as the current task.

Figure 17:
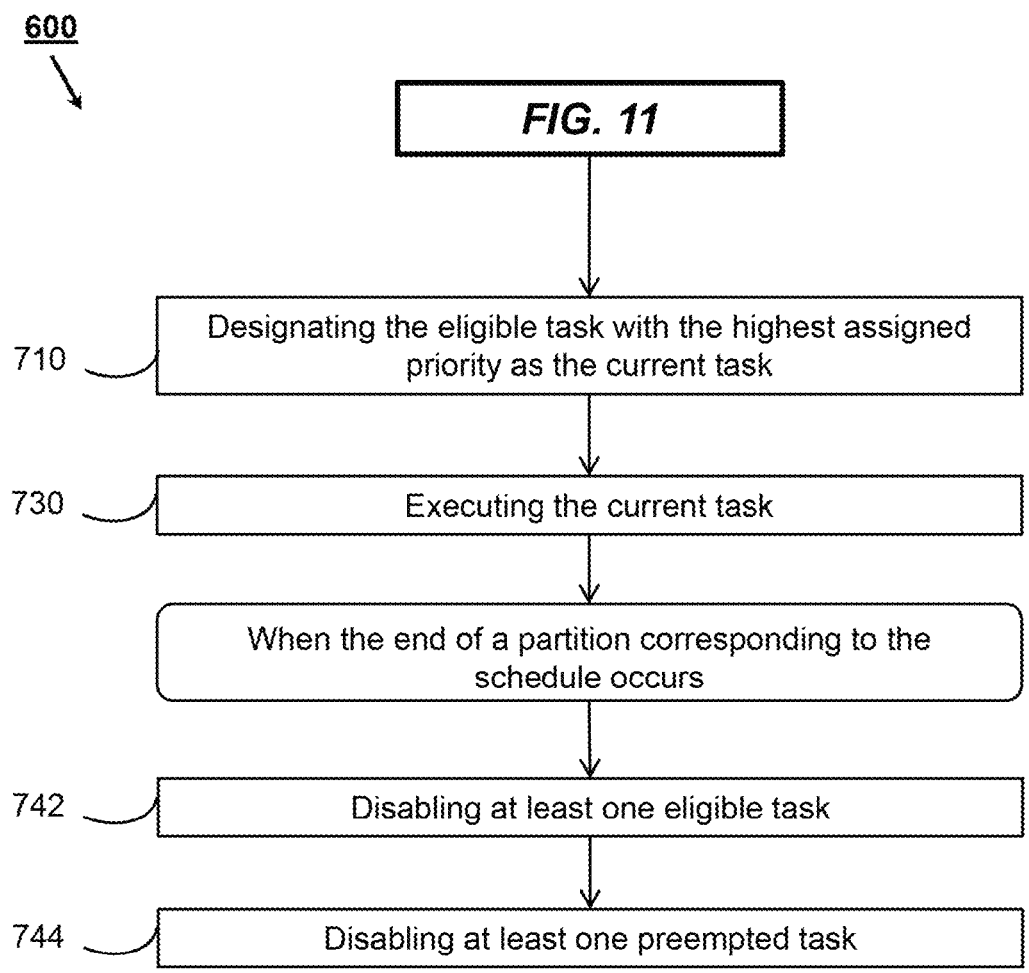

Referring to FIG. 17, the method 600 as illustrated by FIG. 11 may have additional steps 742 and 744. At step 742, when the end of a partition corresponding to the schedule occurs, the method 600 disables at least one eligible task. At step 744, the method 600 disables at least one preempted task.

Figure 18:
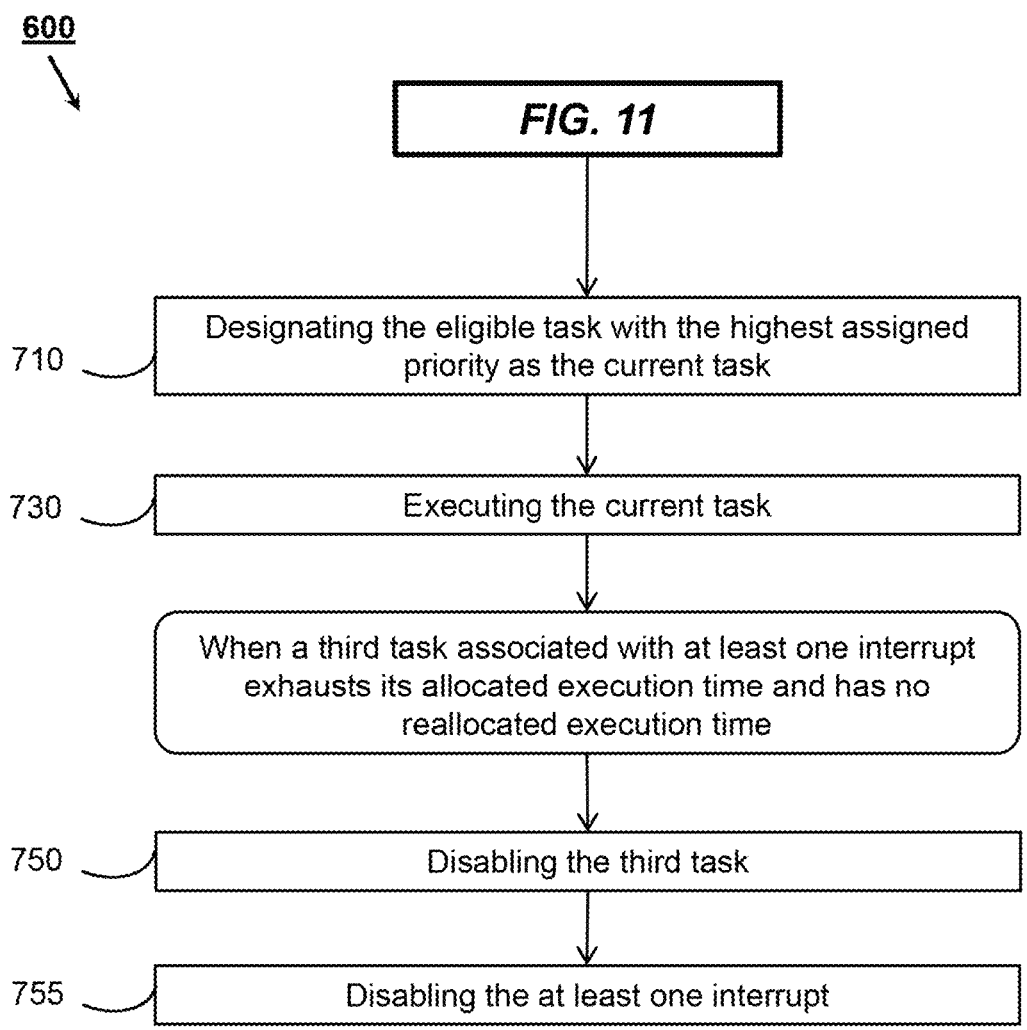

Referring to FIG. 18, the method 600 as illustrated by FIG. 11 may have additional steps 750 and 755. At step 750, when a third task associated with at least one interrupt exhausts its allocated execution time and has no reallocated execution time, the method 600 disables the third task. At step 755, the method 600 disables the at least one interrupt.

Figure 19:
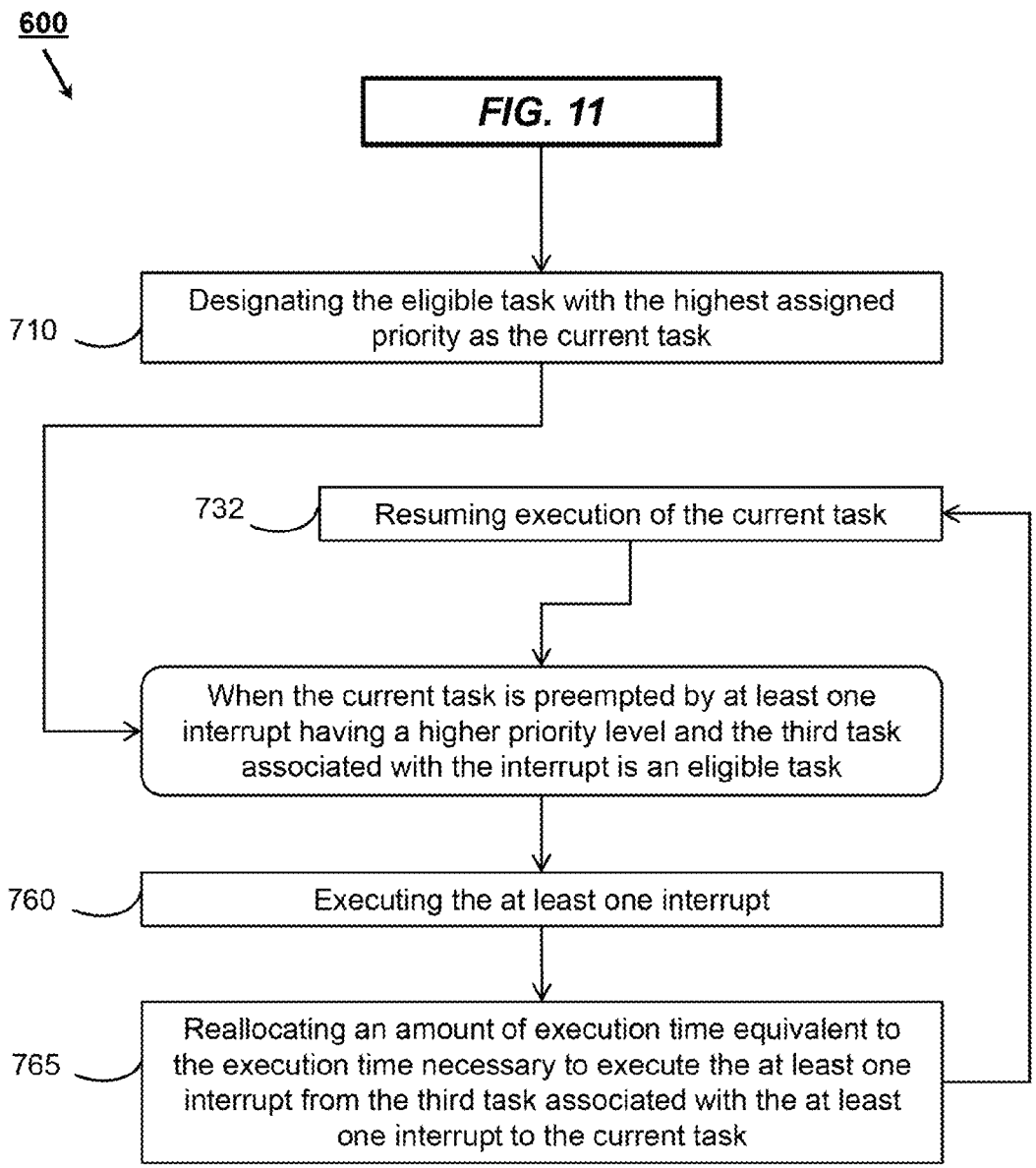

Referring to FIG. 19, the method 600 as illustrated by FIG. 11 may include additional steps 732, 760, and 765. At step 760, when the current task is preempted by at least one interrupt having a higher priority level and the third task associated with the at least one interrupt is an eligible task, the method 600 executes the at least one interrupt. In some embodiments, executing the at least one interrupt may include designating the current task as a preempted task and then designating the at least one interrupt as the current task. At step 765, the method 600 reallocates an amount of execution time equivalent to the execution time necessary to execute the at least one interrupt from the third task associated with the interrupt to the current task. At step 732, the method 600 resumes execution of the current task.

Figure 20:
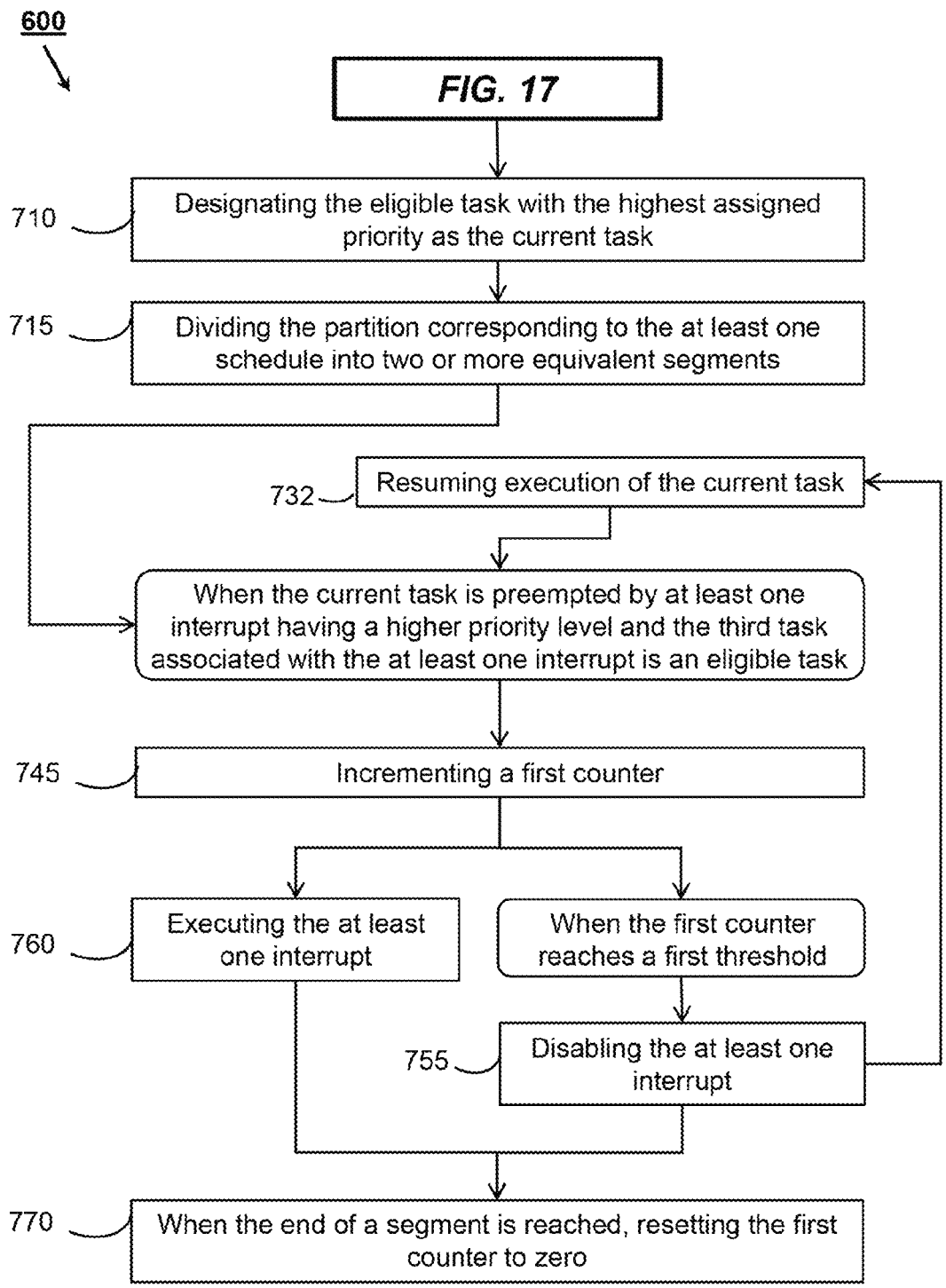

Referring to FIG. 20, the method 600 as illustrated by FIG. 17 may have additional steps 715, 745, and 770. At step 715, the method 600 divides the partition corresponding to the at least one schedule into two or more equivalent segments. At step 745, when the current task is preempted by at least one interrupt having a higher priority level and the third task associated with the at least one interrupt is an eligible task, the method 600 increments a first counter. At step 755, when the first counter reaches a first threshold, the method 600 disables the at least one interrupt. At step 732, the method 600 resumes execution of the current task. Otherwise, i.e., if the first counter has not reached the first threshold, at step 760 the method 600 executes the at least one interrupt. At step 770, when the end of a segment is reached, the method 600 resets the first counter to zero.

Figure 21:
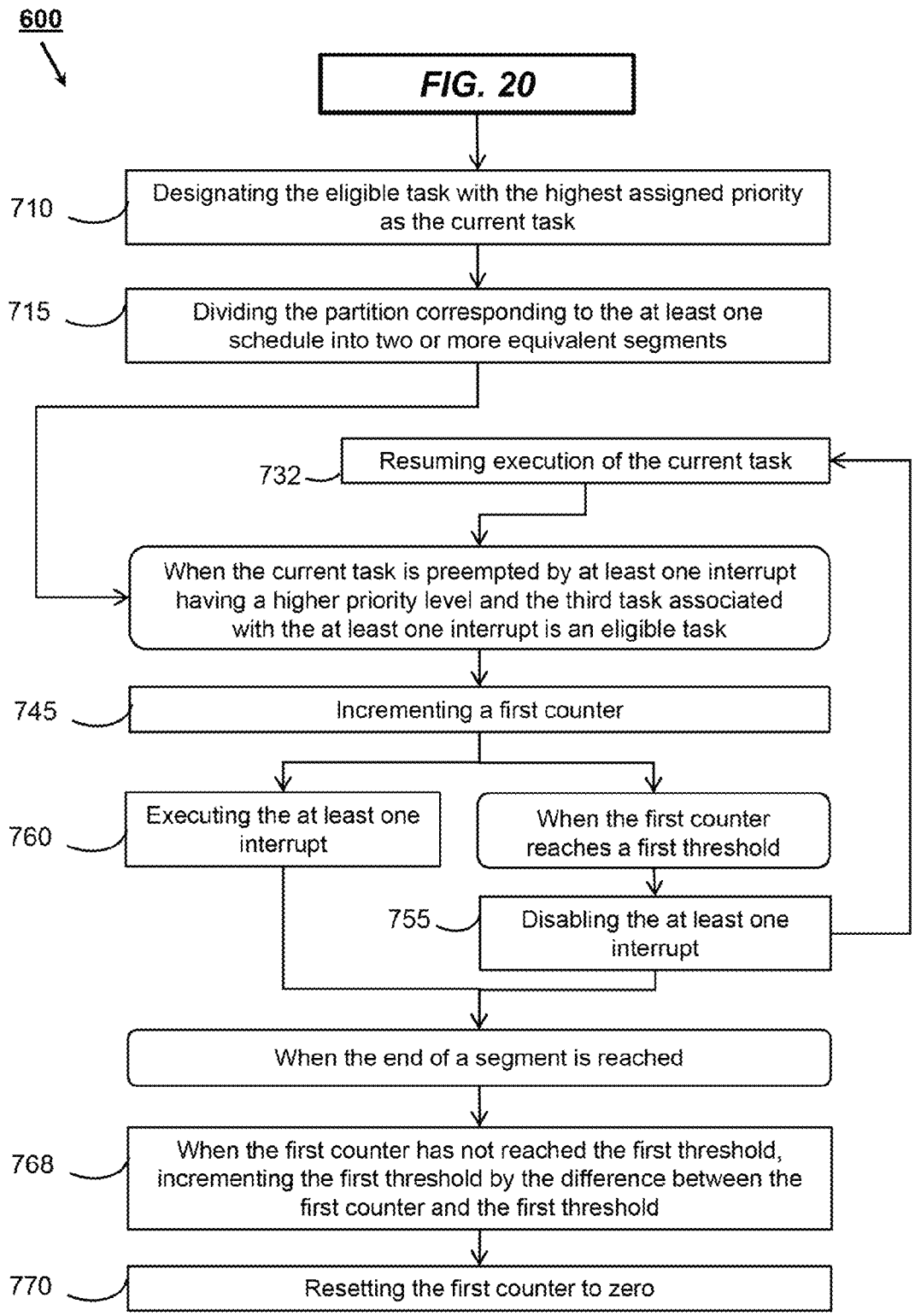

Referring to FIG. 21, the method 600 as illustrated by FIG. 20 may have an additional step 768. At step 768, when the end of a segment is reached and the first counter has not reached the first threshold, the method 600 increments the first threshold by the difference between the first counter and the first threshold.

Figure 22:
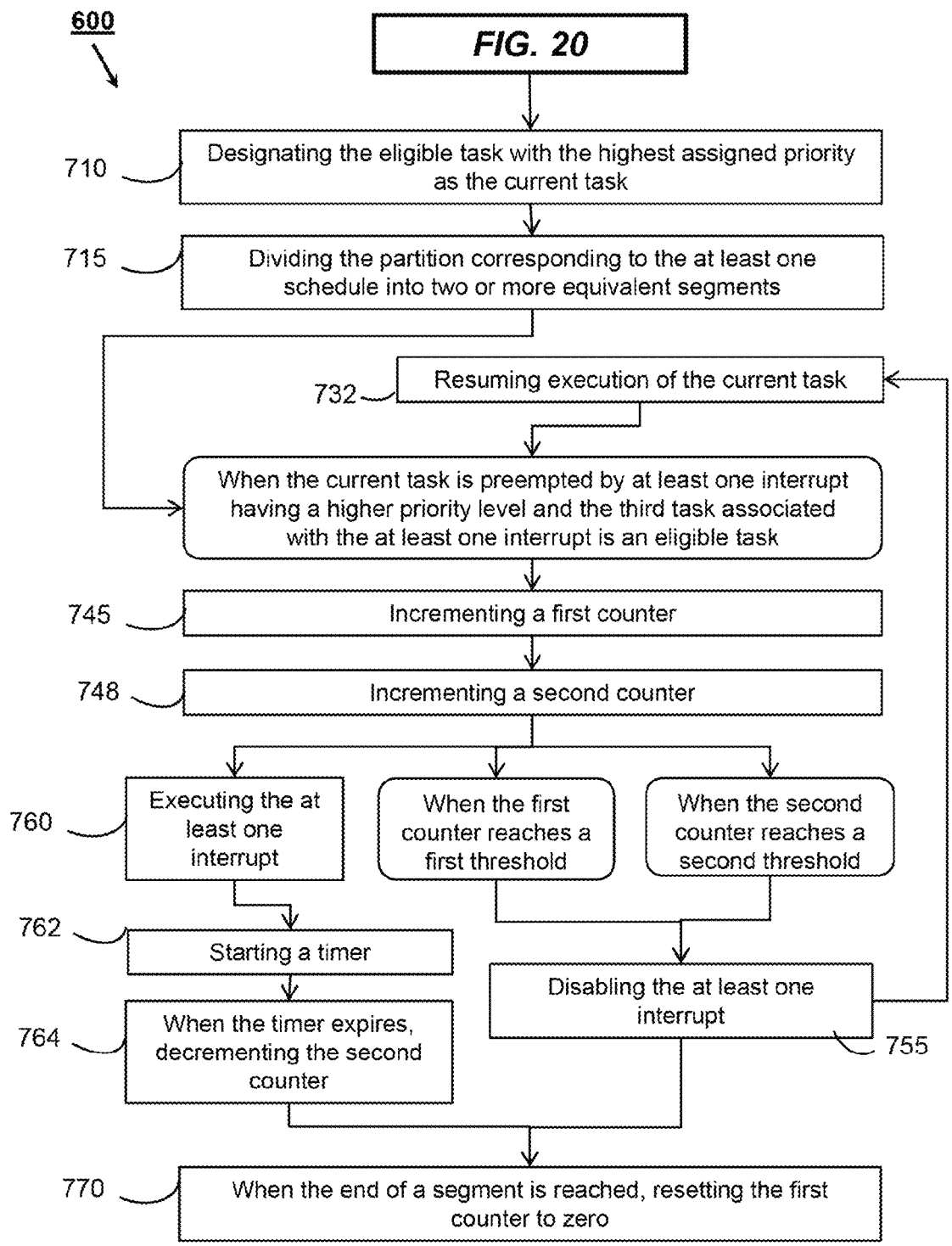

Referring to FIG. 22, the method 600 as illustrated by FIG. 20 may have additional steps 748, 762, and 764. At step 748, when the current task is preempted by at least one interrupt having a higher priority level and the third task associated with the at least one interrupt is an eligible task, the method 600 increments a second counter. At step 755, when the second counter reaches a second threshold, the method 600 disables the at least one interrupt. At step 732, the method 600 resumes execution of the current task. Otherwise, i.e., when the second counter has not reached a second threshold, at step 760, the method 600 executes the at least one interrupt. At step 762, the method 600 starts a timer. At step 764, when the timer expires, the method 600 decrements the second counter.

Figure 23:
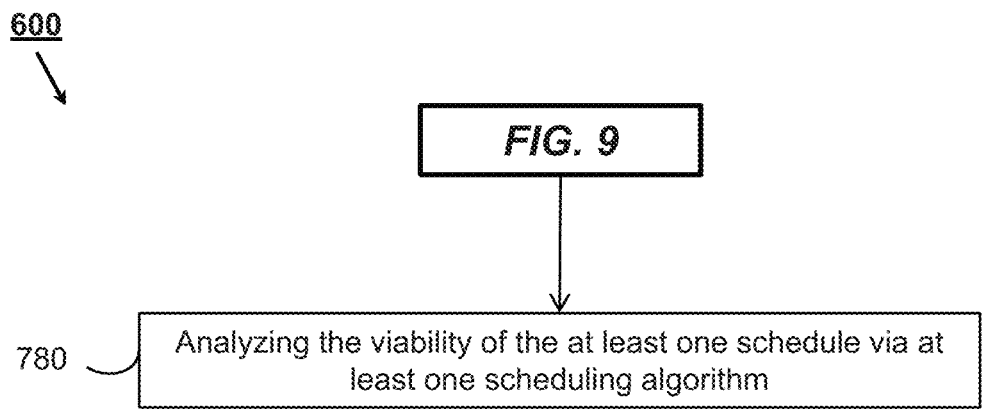

Referring to FIG. 23, the method 600 as illustrated by FIG. 9 may include an additional step 780. At step 780, the system 600 analyzes the viability of the at least one schedule via at least one scheduling algorithm. In one embodiment, the at least one scheduling algorithm may include at least one of Rate Monotonic Analysis (RMA) and Earliest Deadline First (EDF) or any equivalent scheduling algorithm.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A method for multi-core partition scheduling, the method comprising:
   defining, via a partition scheduler of a multi-core avionics processing system including at least one processing core, at least one time frame corresponding to a partition schedule of one or more tasks configured to execute via the at least one processing core, the time frame bounded by a first start time and a first end time;
   designating at least one first task of the one or more tasks as a critical task by allocating, via the partition scheduler, a first execution time to the at least one first, the at least one first execution time equivalent to a worst-case execution time (WCET) of the at least one first task;
   designating at least one second task of the one or more tasks as a noncritical task by allocating, via the partition scheduler, a second execution time to the at least one second task, the at least one second execution time equivalent to at least the minimum necessary completion time of the at least one second task;
   assigning, via the partition scheduler, at least one priority level to the at least one critical task and the at least one noncritical task;
   designating at least one of the at least one first critical task and the at least one noncritical task as an offset task by associating, via the partition scheduler, at least one offset time with at least one of a first critical task and a first noncritical task, the at least one offset time occurring between the first start time and the first end time;
   designating, via the partition scheduler, at least one of a second critical task and a second noncritical task as an eligible task, the at least one of a second critical task and a second noncritical task not associated with the at least one offset time;
   designating, via the partition scheduler, at least one first eligible task of the at least one second noncritical task as an interrupt handler associated with at least one interrupt to be executed by the at least one processing core;
   generating, via the partition scheduler, at least one first hierarchy by arranging the at least one eligible task according to the at least one priority level in descending order; and
   generating, via the partition scheduler, at least one second hierarchy including the at least one offset task.

2. The method of claim 1, further comprising:
   executing the partition schedule by designating at least one second eligible task of the first hierarchy as the current task based on the at least one priority level; and
   executing the current task via the at least one processing core.

3. The method of claim 2, further comprising:
   at the at least one offset time, adding the at least one associated offset task to the first hierarchy;
   if the priority level of the at least one associated offset task is higher than the priority level of the current task, a) designating the current task as the preempted task and b) designating the at least one associated offset task as the current task.

4. The method of claim 2, further comprising:
   determining, via the partition scheduler, that the current task has completed;
   disabling the current task by removing the current task from the first hierarchy;
   designating the preempted task as the current task; and
   if there is no preempted task, designating at least one second eligible task of the first hierarchy as the current task based on the at least one priority level.

5. The method of claim 4, wherein determining, via the partition scheduler, that the current task has completed includes at least one of:
   determining, via the partition scheduler, that the current task has expended at least one of the allocated first execution time, the allocated second execution time, and the assigned first upper bound; and
   determining, via the partition scheduler, that the current task has returned a result; and
   if the current task has not expended the at least one of the allocated first execution time, the allocated second execution time, and the assigned first upper bound, reallocating at least one of the remaining first execution time and the second execution time to the at least one eligible task via the partition scheduler.

6. The method of claim 2, further comprising:
   when the first end time occurs,
   disabling the current task by removing the current task from the first hierarchy;
   disabling the preempted task by removing the preempted task from the first hierarchy; and
   removing the one or more eligible tasks from the first hierarchy.

7. The method of claim 2, further comprising:
   adding to the first hierarchy the at least one interrupt;
   designating the current task as the preempted task;
   designating the at least one interrupt as the current task; and measuring at least one interrupt time by starting an interrupt timer of the partition scheduler, the interrupt timer associated with the at least one interrupt.

8. The method of claim 7, further comprising:
dividing the at least one time frame into a sequential plurality of first frame windows, each first frame window having a first length and bounded by a second start time and a second end time;
defining at least one second upper bound corresponding to a maximum number of interrupts allowed to execute during each first frame window;
at the second start time, setting a first interrupt counter of the partition scheduler to zero;
when the at least one interrupt is designated as the current task, incrementing the first interrupt counter;
when the first interrupt counter exceeds the second upper bound, disabling the at least one interrupt and designating the preempted task as the current task; and
when the second end time is reached, resetting the first interrupt counter to zero.

9. The method of claim 8, wherein the when the second end time is reached, resetting the first interrupt counter to zero includes:
when the second end time is reached and the first interrupt counter does not exceed the second upper bound, a) storing the second upper bound to a memory of the partition scheduler and b) revising the second upper bound by incrementing the second upper bound by the difference between the interrupt counter and the stored second upper bound; and
when the first interrupt counter exceeds the revised second upper bound, resetting the second upper bound to the stored second upper bound.

10. The method of claim 7, further comprising:
determining, via the partition scheduler, that the current task has completed;
stopping the interrupt timer;
deallocating, via the partition scheduler, the interrupt time from the allocated second execution time of the interrupt handler associated with the at least one interrupt;
reallocating, via the partition scheduler, the interrupt time to at least one of the allocated first execution time of the preempted task, the allocated second execution time of the preempted task, and the assigned first upper bound of the preempted task; and
designating, via the partition scheduler, the preempted task as the current task.

11. The method of claim 7, further comprising:
defining, via the partition scheduler, a second frame window having a second length shorter than the time frame;
defining, via the partition scheduler, a third upper bound corresponding to a maximum number of interrupts allowed during the second frame window;
when the at least one interrupt is designated as the current task,
a) starting at least one countdown timer of the partition scheduler, the countdown timer configured to count down from the second window length; and
b) incrementing at least one second interrupt counter of the partition scheduler, the at least one second interrupt counter associated with the at least one countdown timer;
if the at least one second interrupt counter exceeds the third upper bound, disabling the at least one interrupt and designating the preempted task as the current task via the partition scheduler; and when the at least one countdown timer expires, resetting the at least one associated second interrupt counter to zero.

12. The method of claim 1, further comprising:
determining, via the partition scheduler, that the at least one priority level of at least one third eligible task of the first hierarchy is higher than the first priority level of the current task;
designating, via the partition scheduler, the current task as a preempted task; and
designating, via the partition scheduler, the at least one third eligible task as the current task.

13. The method of claim 1, wherein the at least one partition schedule corresponds to an ARINC 653 partition.

14. The method of claim 1, wherein designating at least one second task of the one or more tasks as a noncritical task by allocating, via the partition scheduler, a second execution time to the at least one second task, the at least one second execution time equivalent to at least the minimum necessary completion time of the at least one second task includes:
assigning, via the partition scheduler, a first upper bound to the at least one second execution time.

15. An avionics processing system including an adaptive partition scheduler, comprising:
at least one processing core configured to execute one or more processes, the one or more processes including at least one interrupt associated with an interrupt handler;
at least one partition scheduler configured to execute on the at least one processing core, the at least one partition scheduler configured to
define at least one time frame corresponding to a partition schedule including the one or more processes, the time frame bounded by a start time and an end time;
designate at least one first process of the one or more processes as a critical process by allocating at least one first execution time to the at least one first process, the at least one first execution time equivalent to the worst case execution time (WCET) of the at least one first process;
designate at least one second process of the one or more processes as a noncritical process by allocating at least one second execution time to the at least one second process, the at least one second execution time at least the minimum necessary completion time of the at least one second process;
assign at least one priority level to each of the at least one critical process and the at least one noncritical process;
assign at least one first upper bound to the at least one second execution time;
designate at least one of a first critical process and a first noncritical process as an offset process by associating at least one first offset time with the at least one of a first critical process and a first noncritical process, the at least one offset time occurring between the start time and the end time;
designate at least one of a second critical process and a second noncritical process as an eligible process, the at least one of a second critical process and a second noncritical process not associated with the at least one offset time;
designate at least one first eligible process of the at least one second noncritical process as the at least one interrupt handler;

generate at least one first hierarchy by arranging the at least one eligible process according to the at least one priority level in descending order; and generate at least one second hierarchy including the at least one offset process.

16. The avionics processing system of claim 15, wherein the partition schedule is associated with an ARINC 653 partition.

17. The avionics processing system of claim 15, wherein the at least one partition scheduler is configured to:

designate at least one second eligible process of the first hierarchy as the current process based on the at least one priority level;

when at least one of the priority level of at least one third eligible process of the first hierarchy is higher than the priority level of the current process, a) designate the current process as the preempted process and b) designate the at least one third eligible process as the current process;

when the at least one offset time occurs, add the at least one offset process associated with the at least one offset time to the at least one first hierarchy;

determine whether the current process has completed based on one or more of the at least one first execution time, the at least one second execution time, the at least one first upper bound, and a result associated with the current process;

when the current process completes, disable the current process by removing the current process from the at least one first hierarchy and designating the preempted process as the current process;

add the at least one interrupt to the at least one first hierarchy;

when the at least one interrupt is added to the at least one first hierarchy, a) designate the current process as the preempted process and designate the at least one interrupt as the current process;

when the end time occurs, a) remove the current process and the preempted process from the at least one first hierarchy and b) remove the at least one eligible process from the at least one first hierarchy.

18. The avionics processing system of claim 17, wherein the at least one partition scheduler is further configured to:

when the at least one interrupt is designated as the current process, a) start an interrupt timer associated with the at least one interrupt, the interrupt timer configured to measure an interrupt execution time of the at least one interrupt;

b) when the current process has completed, stop the interrupt timer;

c) deallocate the at least one interrupt execution time from the second execution time of the interrupt handler associated with the at least one interrupt; and d) reallocate the at least one interrupt execution time to at least one of the first execution time of the preempted process and the second execution time of the preempted process.

19. The avionics processing system of claim 17, wherein the at least one partition scheduler is further configured to limit the number of interrupts designated as the current process by implementing one or more rate limiting techniques.

20. The avionics processing system of claim 19, wherein the one or more rate limiting techniques include a leaky-bucket technique, a cumulative-window technique, and a sliding-window technique.

* * * * *